United States Patent
Tang et al.

(10) Patent No.: US 11,647,390 B2
(45) Date of Patent: May 9, 2023

(54) INFORMATION EXCHANGE METHOD AND APPARATUS

(71) Applicant: HUAWEI TECHNOLOGIES CO., LTD., Shenzhen (CN)

(72) Inventors: Bin Tang, Shanghai (CN); Feng Yu, Beijing (CN); Jiangwei Ying, Beijing (CN); Jingxuan Tu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 16/860,289

(22) Filed: Apr. 28, 2020

(65) Prior Publication Data

US 2020/0260285 A1 Aug. 13, 2020

Related U.S. Application Data

(63) Continuation of application No. PCT/CN2018/105504, filed on Sep. 13, 2018.

(30) Foreign Application Priority Data

Nov. 3, 2017 (CN) .......................... 201711071266.5

(51) Int. Cl.
*H04W 12/108* (2021.01)
*H04L 9/40* (2022.01)
(Continued)

(52) U.S. Cl.
CPC ....... *H04W 12/108* (2021.01); *H04L 63/0876* (2013.01); *H04W 12/03* (2021.01);
(Continued)

(58) Field of Classification Search
None
See application file for complete search history.

(56) References Cited

U.S. PATENT DOCUMENTS 9,563,616 B2 2/2017 Howell et al.
9,589,397 B1 3/2017 Christopher et al.
(Continued)

FOREIGN PATENT DOCUMENTS

CN 101835156 A 9/2010
CN 102056157 A 5/2011
(Continued)

OTHER PUBLICATIONS

Huawei, HiSilicon, Identification of Air-borne UE. 3GPP TSG-RAN WG2 Meeting #99, Berlin, Germany, Aug. 21, 2017, R2-1708543, 3 pages.
(Continued)

*Primary Examiner* — Andre Tacdiran
(74) *Attorney, Agent, or Firm* — Rimon PC

(57) ABSTRACT

This application discloses an information exchange method and apparatus. In the method, a terminal device transmits attach request information to a core network device, receives attach accept information of the core network device, where the attach accept information includes a first integrity check code; the terminal device obtains a second integrity check code based on the attach accept information; and the terminal device obtains, if the first integrity check code is the same as the second integrity check code, a third integrity check code based on encrypted attach complete information, and transmits encrypted attach complete information to which the third integrity check code is added to the core network device. This reduces data exchange procedures, reduces an amount of data of exchanged information, and reduces a time consumed in an information exchange process performed between the terminal device and the core network device.

15 Claims, 5 Drawing Sheets

(51) Int. Cl.
 *H04W 12/06* (2021.01)
 *H04W 28/06* (2009.01)
 *H04W 48/18* (2009.01)
 *H04W 52/02* (2009.01)
 *H04W 12/03* (2021.01)
 *H04W 12/041* (2021.01)

(52) U.S. Cl.
 CPC ......... *H04W 12/041* (2021.01); *H04W 12/06* (2013.01); *H04W 28/06* (2013.01); *H04W 48/18* (2013.01); *H04W 52/0209* (2013.01)

(56) References Cited

U.S. PATENT DOCUMENTS

| | | | |
|---|---|---|---|
| 2010/0260096 A1* | 10/2010 | Ulupinar | H04W 76/12 370/315 |
| 2012/0005731 A1* | 1/2012 | Lei | H04W 12/062 726/6 |
| 2014/0105383 A1* | 4/2014 | Zhang | G06F 21/602 380/28 |
| 2015/0082393 A1* | 3/2015 | Chen | H04W 12/04 726/4 |
| 2017/0006469 A1 | 1/2017 | Palanigounder | |
| 2017/0034839 A1 | 2/2017 | Rubin et al. | |
| 2019/0058983 A1* | 2/2019 | Guven | H04L 67/306 |
| 2020/0359350 A1* | 11/2020 | Soliman | H04W 12/06 |

FOREIGN PATENT DOCUMENTS

| | | |
|---|---|---|
| CN | 102056347 A | 5/2011 |
| CN | 102215474 A | 10/2011 |
| CN | 102238146 A | 11/2011 |
| CN | 102333386 A | 1/2012 |
| CN | 102404329 A | 4/2012 |
| CN | 102438330 A | 5/2012 |
| CN | 102625306 A | 8/2012 |
| CN | 102056157 B * | 9/2013 |
| CN | 104852994 A | 8/2015 |
| CN | 106465096 A | 2/2017 |
| CN | 106790034 A | 5/2017 |
| CN | 106856604 A | 6/2017 |
| CN | 106878974 A | 6/2017 |
| CN | 106888092 A | 6/2017 |
| CN | 106899410 A | 6/2017 |
| CN | 107005844 A | 8/2017 |
| EP | 2317694 A1 | 5/2011 |
| EP | 2713664 A1 | 4/2014 |
| EP | 2790454 A1 | 10/2014 |
| EP | 3 393 159 B1 * | 5/2016 |
| EP | 3185638 A1 | 6/2017 |
| WO | 2017076891 A1 | 5/2017 |
| WO | 2017121854 A1 | 7/2017 |
| WO | 2017189139 A1 | 11/2017 |

OTHER PUBLICATIONS

Ericsson,"Corrections to EASE",3GPP TSG-SA WG3 Meeting #84 ,S3-161180,Chennai, India, Jul. 25, 2016, total 8 pages.

3GPP TS 23.401 V9.4.0 (Mar. 1, 2010) 3rd Generation Partnership Project;Technical Specification Group Services and System Aspects;General Packet Radio Service (GPRS) enhancements for Evolved Universal Terrestrial Radio Access Network (E-UTRAN) access(Release 9), total 258 pages.

* cited by examiner

INFORMATION EXCHANGE METHOD AND APPARATUS

CROSS-REFERENCE TO RELATED APPLICATIONS

This application is a continuation of International Application No. PCT/CN2018/105504, filed on Sep. 13, 2018, which claims priority to Chinese Patent Application No. 201711071266.5, filed on Nov. 3, 2017. The disclosures of the aforementioned applications are hereby incorporated by reference in their entireties.

TECHNICAL FIELD

This application relates to the field of communications technologies, and in particular, to an information exchange method and apparatus.

BACKGROUND

Currently, a terminal device and a core network device are disposed in some communications systems, and the terminal device and the core network device usually can exchange information. For example, the terminal device may transmit the information to a radio access network device, and then the radio access network device transmits the information to the core network device, to implement information exchange between the terminal device and the core network device.

In addition, to ensure security of a communications system, when exchanging information, a terminal device and a core network device need to perform identity authentication on each other, and perform data protection on the exchanged information. In the prior art, to implement identity authentication and data protection, when the terminal device accesses the core network device for the first time, the terminal device and the core network device usually need to transmit respective identity authentication information to each other. In this case, the terminal device performs identity authentication on the core network device based on the identity authentication information of the core network device, and the core network device performs identity authentication on the terminal device based on the identity authentication information of the terminal device. After both the terminal device and the core network device pass identity authentication, the core network device selects an integrity algorithm and an encryption and decryption algorithm that are used for data protection, and transmits the selected integrity algorithm and encryption and decryption algorithm to the terminal device. The terminal device determines whether the terminal device supports the integrity algorithm and the encryption and decryption algorithm that are selected by the core network device, and after determining that the terminal device supports the integrity algorithm and the encryption and decryption algorithm that are selected by the core network device, the terminal device sends a corresponding feedback to the core network device. After receiving the feedback, the core network device determines that the terminal device accesses the core network device. Based on the foregoing steps, both the terminal device and the core network device perform identity authentication on each other, and complete negotiation on the integrity algorithm and the encryption algorithm. Afterwards, when the terminal device and the core network device perform information exchange, integrity protection and encryption protection are performed on all exchanged information. This improves security of the communications system.

However, in a research process of this application, the inventor finds that although security of a communications system can be ensured in the prior art, identity authentication can be completed and an integrity algorithm and an encryption and decryption algorithm that are used for data protection can be determined only by performing a plurality of times of information exchange between the terminal device and the core network device. There are a relatively large quantity of times of information exchange, and a relatively large amount of data of exchanged information. Consequently, in the prior art, there are problems of long time consumption of an information exchange process and high overheads of power consumption of the terminal device.

SUMMARY

In the prior art, to ensure security of a communications system, a terminal device needs to exchange information with a core network device for a plurality of times, and an amount of data of the exchanged information is relatively large. Consequently, in the prior art, there are problems of long time consumption of an information exchange process and high overheads of power consumption of the terminal device. To resolve the problems in the prior art, the embodiments of this application disclose an information exchange method and apparatus.

According to a first aspect of this application, an information exchange method is disclosed. The information exchange method includes: transmitting, by a terminal device, attach request information to a core network device; receiving, by the terminal device, attach accept information transmitted by the core network device, where the attach accept information includes a first integrity check code of the core network device; obtaining, by the terminal device, a second integrity check code based on the attach accept information; and obtaining, by the terminal device if the first integrity check code is the same as the second integrity check code, encrypted attach complete information, obtaining a third integrity check code based on the encrypted attach complete information, and transmitting encrypted attach complete information to which the third integrity check code is added to the core network device.

According to the information exchange method, only the attach request information, the attach accept information, and the attach complete information need to be transmitted between the terminal device and the core network device. That is, the terminal device and the core network device can implement identity authentication on each other and data protection by performing information exchange for three times.

With reference to the first aspect, in a first possible implementation of the first aspect, the obtaining, by the terminal device, a second integrity check code based on the attach accept information includes: generating, by the terminal device, a first terminal key by using a preset first key generation algorithm based on a preset first root key, a terminal device parameter, and a core network device parameter that is included in the attach accept information; and obtaining, by the terminal device, the second integrity check code by using a preset first integrity algorithm based on the first terminal key and the attach accept information.

According to the foregoing steps, the terminal can obtain the second integrity check code, so that in a subsequent process, the terminal determines validity of an identity of the core network based on whether the second integrity check code is the same as the first integrity check code.

With reference to the first aspect, in a second possible implementation of the first aspect, the obtaining, by the terminal device, encrypted attach complete information includes: generating, by the terminal device, a second terminal key by using a preset second key generation algorithm based on a preset second root key, a terminal device parameter, and a core network device parameter that is included in the attach accept information; and encrypting, by the terminal device after generating attach complete information, the attach complete information by using a preset first encryption and decryption algorithm based on the second terminal key.

According to the foregoing steps, the terminal can encrypt the attach complete information, so that in a subsequent process, the core network determines, based on whether the core network can decrypt the received attach complete information, whether the terminal can access the core network.

With reference to the first possible implementation of the first aspect, or with reference to the second possible implementation of the first aspect, in a third possible implementation of the first aspect, the terminal device parameter includes a terminal device identity and a terminal random number that is generated by the terminal device. The terminal device identity can distinguish between different terminal devices, and the terminal random number is not easily spoofed. This improves security of the terminal device parameter.

With reference to the first possible implementation of the first aspect, or with reference to the second possible implementation of the first aspect, in a fourth possible implementation of the first aspect, the core network device parameter includes a core network device identity and a core network random number that is generated by the core network device. The core network device identity can distinguish between different core network devices, and the core network random number is not easily spoofed. This improves security of the core network device parameter.

According to a second aspect of this application, an information exchange method is disclosed. The information exchange method includes: receiving, by a core network device, attach request information transmitted by a terminal device; obtaining, by the core network device after generating attach accept information, a first integrity check code based on the attach accept information, and transmitting attach accept information to which the first integrity check code is added to the terminal device; receiving, by the core network device, encrypted attach complete information transmitted by the terminal device, where the attach complete information includes a third integrity check code of the terminal device; obtaining, by the core network device, a fourth integrity check code based on the encrypted attach complete information; and decrypting, by the core network device, the encrypted attach complete information if the third integrity check code is the same as the fourth integrity check code, and determining, after the decryption succeeds, that the terminal device accesses the core network device.

According to the information exchange method, only the attach request information, the attach accept information, and the attach complete information need to be transmitted between the terminal device and the core network device. That is, the terminal device and the core network device can implement identity authentication on each other and data protection by performing information exchange for only three times.

With reference to the second aspect, in a first possible implementation of the second aspect, the obtaining a first integrity check code based on the attach accept information includes: generating, by the core network device, a first core network key by using a preset third key generation algorithm based on a preset third root key, a core network device parameter, and a terminal device parameter that is included in the attach request information; and obtaining, by the core network device, the first integrity check code by using a preset second integrity algorithm based on the first core network key and the attach accept information.

According to the foregoing steps, the core network device can obtain the first integrity check code, so that in a subsequent process, the terminal device determines validity of an identity of the core network based on whether the second integrity check code is the same as the first integrity check code.

With reference to the second aspect, in a second possible implementation of the second aspect, the decrypting, by the core network device, the encrypted attach complete information includes: generating, by the core network device, a second core network key by using a preset fourth key algorithm based on a preset fourth root key, a core network device parameter, and a terminal device parameter that is included in the attach request information; and decrypting, by the core network device, the encrypted attach complete information by using a preset second encryption and decryption algorithm based on the second core network key.

According to the foregoing steps, the core network device can determine, based on whether the core network device successfully decrypts the received attach complete information, whether the terminal device can access the core network device.

With reference to the first possible implementation of the second aspect, or with reference to the second possible implementation of the second aspect, in a third possible implementation of the second aspect, the terminal device parameter includes a terminal device identity and a terminal random number that is generated by the terminal device.

The terminal device identity can distinguish between different terminal devices, and the terminal random number is not easily spoofed. This improves security of the terminal device parameter.

With reference to the first possible implementation of the second aspect, or with reference to the second possible implementation of the second aspect, in a fourth possible implementation of the second aspect, the core network device parameter includes a core network device identity and a core network random number that is generated by the core network device.

The core network device identity can distinguish between different core network devices, and the core network random number is not easily spoofed. This improves security of the core network device parameter.

According to a third aspect of this application, an information exchange apparatus is disclosed. The information exchange apparatus includes: a first sending module, a first receiving module, and a first processing module, where the first sending module is configured to transmit attach request information to a core network device; the first receiving module is configured to receive attach accept information transmitted by the core network device, where the attach accept information includes a first integrity check code of the core network device; and the first processing module is configured to obtain a second integrity check code based on the attach accept information, and the first processing module is configured to obtain, if the first integrity check code is the same as the second integrity check code, encrypted attach complete information, obtain a third integrity check code based on the encrypted attach complete information, and trigger the first sending module to transmit encrypted attach complete information to which the third integrity check code is added to the core network device.

According to the information exchange apparatus, only the attach request information, the attach accept information, and the attach complete information need to be transmitted between the terminal device and the core network device. That is, the terminal device and the core network device can implement identity authentication on each other and data protection by performing information exchange for only three times.

With reference to the third aspect, in a first possible implementation of the third aspect, the first processing module is specifically configured to: generate a first terminal key by using a preset first key generation algorithm based on a preset first root key, a terminal device parameter, and a core network device parameter that is included in the attach accept information, and obtain the second integrity check code by using a preset first integrity algorithm based on the first terminal key and the attach accept information.

With reference to the third aspect, in a second possible implementation of the third aspect, the first processing module is specifically configured to: generate a second terminal key by using a preset second key generation algorithm based on a preset second root key, a terminal device parameter, and a core network device parameter that is included in the attach accept information, and encrypt, after generating attach complete information, the attach complete information by using a preset first encryption and decryption algorithm based on the second terminal key.

With reference to the first possible implementation of the third aspect, or with reference to the second possible implementation of the third aspect, in a third possible implementation of the third aspect, the terminal device parameter includes a terminal device identity and a terminal random number that is generated by the terminal device. The terminal device identity can distinguish between different terminal devices, and the terminal random number is not easily spoofed. This improves security of the terminal device parameter.

With reference to the first possible implementation of the third aspect, or with reference to the second possible implementation of the third aspect, in a fourth possible implementation of the third aspect, the core network device parameter includes a core network device identity and a core network random number that is generated by the core network device. The core network device identity can distinguish between different core network devices, and the core network random number is not easily spoofed. This improves security of the core network device parameter.

According to a fourth aspect of this application, an information exchange apparatus is disclosed. The information exchange apparatus includes: a second receiving module, a second sending module, and a second processing module, where the second receiving module is configured to receive attach request information transmitted by a terminal device; the second processing module is configured to obtain, after generating attach accept information, a first integrity check code based on the attach accept information, and trigger the second sending module to transmit attach accept information to which the first integrity check code is added to the terminal device; the second receiving module is further configured to receive encrypted attach complete information transmitted by the terminal device, where the attach complete information includes a third integrity check code of the terminal device; and the second processing module is further configured to obtain a fourth integrity check code based on the encrypted attach complete information, and the second processing module is configured to: decrypt the encrypted attach complete information if the third integrity check code is the same as the fourth integrity check code, and determine, after the decryption succeeds, that the terminal device can access a core network device.

According to the information exchange apparatus, only the attach request information, the attach accept information, and the attach complete information need to be transmitted between the terminal device and the core network device. That is, the terminal device and the core network device can implement identity authentication on each other and data protection by performing information exchange for only three times.

With reference to the fourth aspect, in a first possible implementation of the fourth aspect, the second processing module is specifically configured to: generate a first core network key by using a preset third key generation algorithm based on a preset third root key, a core network device parameter, and a terminal device parameter that is included in the attach request information, and obtain a first integrity check code by using a preset second integrity algorithm based on the first core network key and the attach accept information.

With reference to the fourth aspect, in a second possible implementation of the fourth aspect, the second processing module is specifically configured to: generate a second core network key by using a preset fourth key generation algorithm based on a preset fourth root key, a core network device parameter, and a terminal device parameter that is included in the attach request information, and decrypt the encrypted attach complete information by using a preset second encryption and decryption algorithm based on the second core network key.

With reference to the first possible implementation of the fourth aspect, or with reference to the second possible implementation of the fourth aspect, in a third possible implementation of the fourth aspect, the terminal device parameter includes a terminal device identity and a terminal random number that is generated by the terminal device. The terminal device identity can distinguish between different terminal devices, and the terminal random number is not easily spoofed. This improves security of the terminal device parameter.

With reference to the first possible implementation of the fourth aspect, or with reference to the second possible implementation of the fourth aspect, in a fourth possible implementation of the fourth aspect, the core network device parameter includes a core network device identity and a core network random number that is generated by the core network device. The core network device identity can distinguish between different core network devices, and the core network random number is not easily spoofed. This improves security of the core network device parameter.

According to a fifth aspect of this application, a terminal device is disclosed. The terminal device includes: a transceiver port, a processor, and a memory connected to the processor. The transceiver port is configured to: perform information receiving and sending with a core network device, and transmit information that is received from the core network device to the processor. The memory stores an instruction that can be executed by the processor. The processor is configured to: obtain a packet transmitted by the transceiver port, and perform, by executing a program or the instruction stored in the memory, the information exchange method in the first aspect of this application.

According to a sixth aspect of this application, a core network device is disclosed. The core network device includes: a transceiver port, a processor, and a memory connected to the processor. The transceiver port is configured to: perform information receiving and sending with a terminal device, and transmit information that is received from the terminal device to the processor. The memory stores an instruction that can be executed by the processor. The processor is configured to: obtain a packet transmitted by the transceiver port, and perform, by executing a program or the instruction stored in the memory, the information exchange method in the second aspect of this application.

According to a seventh aspect of this application, an embodiment of this application further provides a computer program product, including an instruction. When the instruction is run on a computer, the computer is enabled to perform the method in the first aspect of this application.

According to an eighth aspect of this application, an embodiment of this application further provides a computer program product, including an instruction. When the instruction is run on a computer, the computer is enabled to perform the method in the second aspect of this application.

According to a ninth aspect of this application, an embodiment of this application further provides a computer storage medium. The computer storage medium may store a program. When being executed, the program may implement some or all steps in the embodiments of the information exchange method provided in the first aspect.

According to a tenth aspect of this application, an embodiment of this application further provides a computer the storage medium. The computer storage medium may store a program. When being executed, the program may implement some or all steps in the embodiments of the information exchange method provided in the second aspect.

According to an eleventh aspect of this application, an embodiment of this application further provides a chip. The chip apparatus includes a memory, a processor, and a computer program that is stored in the memory and that can be run on the processor. When executing the computer program, the processor implements the method in the first aspect of this application.

According to a twelfth aspect of this application, an embodiment of this application further provides a chip. The chip apparatus includes a memory, a processor, and a computer program that is stored in the memory and that can be run on the processor. When executing the computer program, the processor implements the method in the second aspect of this application.

According to a thirteenth aspect of this application, an embodiment of this application further provides a terminal device. The terminal device includes a processor and a memory. The memory is configured to store a computer executable instruction. When the terminal device runs, the processor executes the computer executable instruction stored in the memory, to enable the terminal device to perform the information exchange method according to the first aspect or the implementations of the first aspect.

According to a fourteenth aspect of this application, an embodiment of this application further provides a core network device. The core network device includes a processor and a memory. The memory is configured to store a computer executable instruction. When the core network device runs, the processor executes the computer executable instruction stored in the memory, to enable the core network device to perform the information exchange method according to the second aspect or the implementations of the second aspect.

According to the solutions disclosed in the embodiments of this application, only the attach request information, the attach accept information, and the attach complete information need to be transmitted between the terminal device and the core network device. That is, the terminal device and the core network device can implement identity authentication on each other and data protection by performing information exchange for only three times. Compared with the prior art, according to the solutions disclosed in the embodiments of this application, data exchange procedures are reduced while security of the communications system is ensured. In addition, an amount of data of the information exchanged between the terminal device and the core network device is reduced. This reduces a time consumed in an information exchange process that is performed between the terminal device and the core network device, and can reduce overheads of power consumption of the terminal device.

DESCRIPTION OF EMBODIMENTS

To ensure security of a communications system, in the prior art, a terminal device needs to exchange information with a core network device for a plurality of times, and an amount of data of the exchanged information is relatively large. Consequently, in the prior art, there are problems of long time consumption of an information exchange process and high overheads of power consumption of the terminal device. To resolve the problems in the prior art, the embodiments of this application disclose an information exchange method and apparatus.

Figure 1:
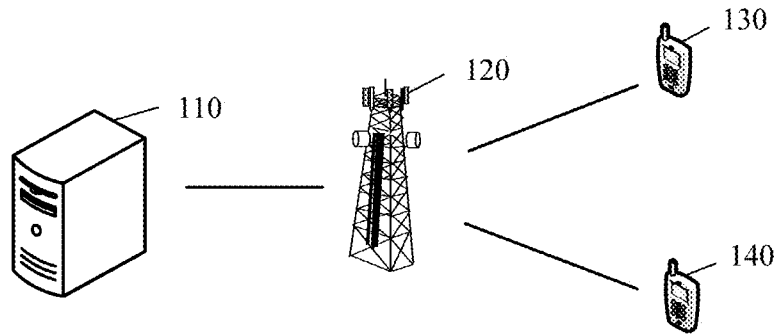
FIG. 1 is a schematic structural diagram of a communications system according to the prior art.

FIG. 1 is a schematic architectural diagram of a communications system to which the embodiments of this application are applied. As shown in FIG. 1, the communications system includes a core network device 110, a radio access network device 120, and at least one terminal device (for example, a terminal device 130 and a terminal device 140 in FIG. 1). The terminal device is connected to the radio access network device 120 in a wireless manner, and the radio access network device 120 is connected to the core network device 110 in a wireless or wired manner. The core network device and the radio access network device may be independent different physical devices, or a function of the core network device and a logical function of the radio access network device may be integrated into a same physical device, or some functions of the core network device and some functions of the radio access network device may be integrated into a physical device. The terminal device may be at a fixed location or may be mobile. FIG. 1 is merely a schematic diagram. The communications system may further include another network device, for example, may further include a wireless relay device and a wireless backhaul device, which are not drawn in FIG. 1. Quantities of core network devices, radio access network devices, and terminal devices that are included in the communications system are not limited in the embodiments of this application.

The radio access network device is an access device used by the terminal device to access the communications system in a wireless manner. The radio access network device may be a base station NodeB, an evolved base station eNodeB, a base station in a 5G mobile communications system, a base station in a future mobile communications system, an access node in a Wi-Fi system or LTE-U or another unlicensed spectrum radio system, or the like. A specific technology and a specific device form that are used by the radio access network device are not limited in the embodiments of this application.

The terminal device may also be referred to as a terminal (Terminal), user equipment (UE), a mobile station (MS), a mobile terminal (MT), or the like. The terminal device may be a mobile phone (mobile phone), a tablet (pad), a computer having a wireless transceiver function, a virtual reality (VR) terminal device, an augmented reality (AR) terminal device, a wireless terminal in industrial control (industrial control), a wireless terminal in unmanned driving (self-driving), a wireless terminal in remote medical surgery, a wireless terminal in smart grid, a wireless terminal in transportation safety, a wireless terminal in smart city, a wireless terminal in smart home, or a smart meter, a smart water meter, an environment sensor, a device label, a positioning label, or the like that has a wireless communication function.

In the embodiments of this application, the terminal device can transmit information to the radio access network device, and then the radio access network device transmits the information to the core network device. In addition, the core network device can further transmit information to the radio access network device, and then the radio access network device transmits the information to the terminal device. That is, information exchange between the terminal device and the core network device can be implemented by using the radio access network device.

The solutions disclosed in the embodiments of this application can be applied to a plurality of communications systems. Specifically, the solutions may be applied to a communications system in which power consumption of a terminal device is limited, to reduce the power consumption of the terminal device by using the solutions disclosed in the embodiments of this application. For example, the solutions disclosed in the embodiments of this application may be applied to cellular network-based narrowband interne of things (NB-IoT) in a 4.5 G mobile communications technology. In this case, the terminal device, the radio access network device, and the core network device are respectively a terminal device, a radio access network device, and a core network device in an NB-IoT system. In addition, information exchange between the terminal device and the core network device is implemented based on the solutions disclosed in the embodiments of this application.

Certainly, the embodiments of this application may be further applied to another communications system that has a terminal device and a core network device and in which the terminal device can exchange information with the core network device. This is not limited in the embodiments of this application.

The following describes the solutions disclosed in this application by using a plurality of embodiments. In a first embodiment disclosed in this application, an information exchange method is disclosed. The method is applied to a terminal device, and the terminal device can exchange information with a core network device by using a radio access network device.

Figure 2:
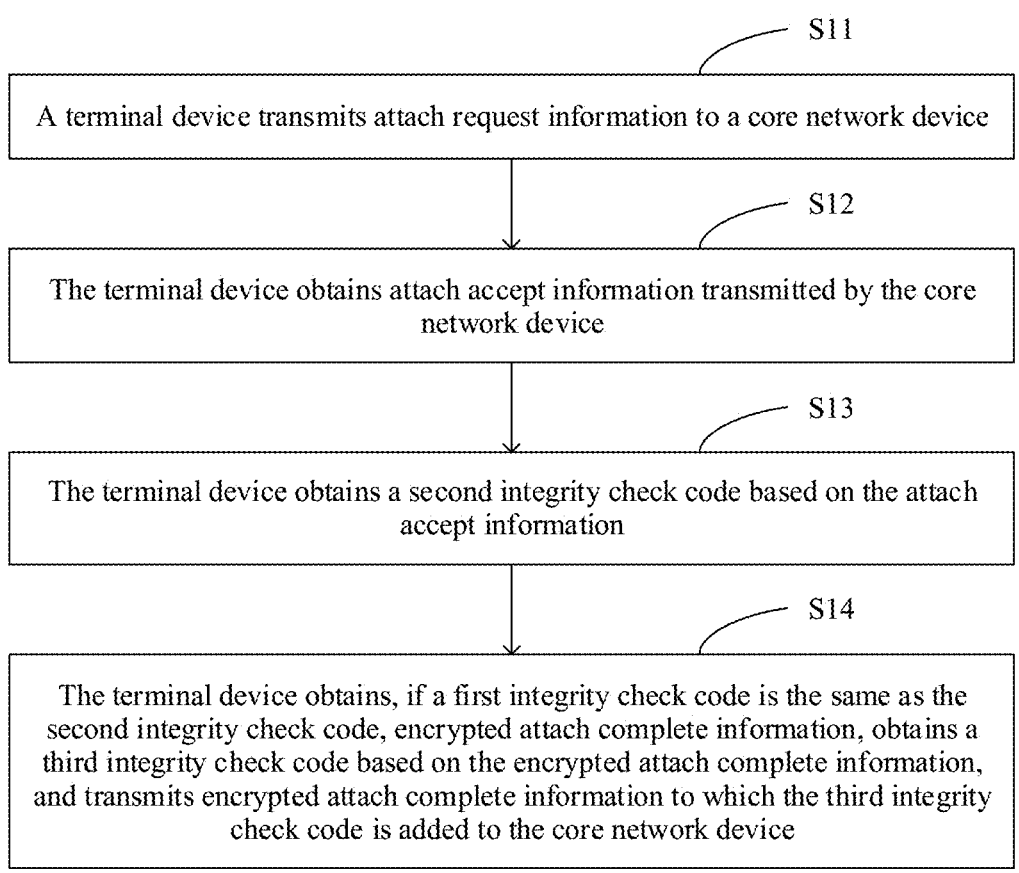
FIG. 2 is a schematic diagram of a working procedure of an information exchange method according to an embodiment of this application.

Referring to a schematic diagram of a working procedure shown in FIG. 2, the information exchange method disclosed in the first embodiment of this application includes the following steps.

Step S11: A terminal device transmits attach request information to a core network device.

In this step, the terminal device transmits the attach request information to a radio access network device, and then the radio access network device transmits the attach request information to the core network device, so that the core network device can receive the attach request information.

In addition, the attach request information may include a terminal device parameter. The terminal device parameter usually includes a terminal device identity and a terminal random number that is generated by the terminal device. The terminal device identity can function to distinguish between different terminal devices. For example, the terminal device identity may be an international mobile subscriber identity (IMSI) of the terminal device.

Step S12: The terminal device receives attach accept information transmitted by the core network device, where the attach accept information includes a first integrity check code of the core network device.

After receiving the attach request information, the core network device generates the attach accept information, calculates the attach accept information, to obtain the first integrity check code, adds the first integrity check code to the attach accept information, and then transmits attach accept information to which the first integrity check code is added to the radio access network device. The radio access network device transmits the attach accept information to which the first integrity check code is added to the terminal device, so that the terminal device obtains the attach accept information.

Step S13: The terminal device obtains a second integrity check code based on the attach accept information.

In this step, the terminal device calculates the attach accept information, to obtain the second integrity check code. When calculating the attach accept information, the terminal device usually performs calculation based on a preset first integrity algorithm.

In addition, the core network device calculates the attach accept information by using a preset second integrity algorithm, to obtain the first integrity check code. In this case, if the terminal device is allowed to access the core network device, the first integrity algorithm is preset to be the same as the second integrity algorithm. That is, the terminal device and the core network device perform integrity verification by using the same integrity algorithm.

Step S14: If the first integrity check code is the same as the second integrity check code, the terminal device obtains encrypted attach complete information, obtains a third integrity check code based on the encrypted attach complete information, and transmits encrypted attach complete information to which the third integrity check code is added to the core network device.

In this step, if the first integrity check code is the same as the second integrity check code, the terminal device determines that an identity of the core network device is valid. That is, in this embodiment of this application, the terminal device performs identity authentication on the core network device by using the integrity check code.

After determining that the identity of the core network device is valid (that is, the first integrity check code is the same as the second integrity check code), the terminal device generates the attach complete information, and then encrypts the attach complete information, to obtain the encrypted attach complete information. Then, the terminal device calculates the encrypted attach complete information by using the first integrity algorithm, to obtain the third integrity check code, and then adds the third integrity check code to the encrypted attach complete information.

In this case, after receiving the attach complete information, the core network device can calculate the attach complete information based on the second integrity algorithm, to obtain a fourth integrity check code. In addition, if determining that the third integrity check code is the same as the fourth integrity check code, the core network device may determine that an identity of the terminal device is valid. That is, the core network device implements identity authentication on the terminal device by using the third integrity check code included in the attach complete information. The first integrity algorithm is the same as the second integrity algorithm.

In addition, the terminal device encrypts the attach complete information, to improve security of the attach complete information. In addition, the terminal device usually encrypts the attach complete information by using a preset first encryption and decryption method, and after receiving the attach complete information, the core network device decrypts the attach complete information by using a preset second encryption and decryption method. If the terminal device is allowed to access the core network device, the first encryption and decryption method is preset to be the same as the second encryption and decryption method. In this case, after determining, based on the integrity check code, that the identity of the terminal device is valid, if the core network device can decrypt the attach complete information based on the second encryption and decryption method, it indicates that the terminal device and the core network device can mutually encrypt and decrypt information exchanged therebetween. In this case, it is determined that the terminal device accesses the core network device.

Further, after the terminal device accesses the core network device, the terminal device and the core network device can continue to exchange information. For example, the terminal device transmits obtained detection data to the core network device by using the radio access network device, and the core network device transmits instruction information and the like to the terminal device by using the radio access network device. In this case, each time information is exchanged, an information transmit end may add, to the exchanged information, an integrity check code obtained through calculation based on the information, and encrypt the information. A receive end that receives the information calculates the information to obtain a corresponding integrity check. If the integrity check code obtained through calculation is the same as the integrity check code added to the information, the receive end may determine that the received information is complete, and after determining that the received information is complete, may perform decryption based on a preset encryption and decryption algorithm. This improves security of a communications system.

This embodiment of this application discloses the information exchange method. In the method, the terminal device transmits the attach request information to the core network device. After receiving the attach request information, the core network device generates the attach accept information, obtains the first integrity check code based on the attach accept information, and adds the first integrity check code to the attach accept information. The terminal device receives the attach accept information transmitted by the core network device, and obtains the second integrity check code based on the attach accept information. If the first integrity check code is the same as the second integrity check code, the terminal device determines that the identity of the core network device is valid, that is, the terminal device implements identity authentication on the core network by using the first integrity check code included in the attach accept information. In addition, after determining that the identity of the core network device is valid, the terminal device generates the attach complete information, encrypts the attach complete information, obtains the third integrity check code based on the encrypted attach complete information, adds the third integrity check code to the encrypted attach complete information, and then transmits encrypted attach complete information to which the third integrity check code is added to the core network device. After receiving the attach complete information, the core network device obtains the fourth integrity check code based on the attach complete information. If the third integrity check code is the same as the fourth integrity check code, the core network device determines that the identity of the terminal device is valid, that is, the core network device implements identity authentication on the terminal device by using the fourth integrity check code included in the attach complete information. Then, the core network device decrypts the attach complete information, and if the decryption succeeds, determines that the terminal device accesses the core network device.

According to the information exchange method disclosed in this embodiment of this application, only the attach request information, the attach accept information, and the attach complete information need to be transmitted between the terminal device and the core network device. That is, the terminal device and the core network device can implement identity authentication on each other and data protection by performing information exchange for only three times.

Compared with the prior art, according to the solutions disclosed in the embodiments of this application, data exchange procedures are reduced while security of the communications system is ensured. In addition, an amount of data of the information exchanged between the terminal device and the core network device is reduced. This reduces a time consumed for information exchange between the terminal device and the core network device, and reduces overheads of power consumption of the terminal device.

Figure 3:
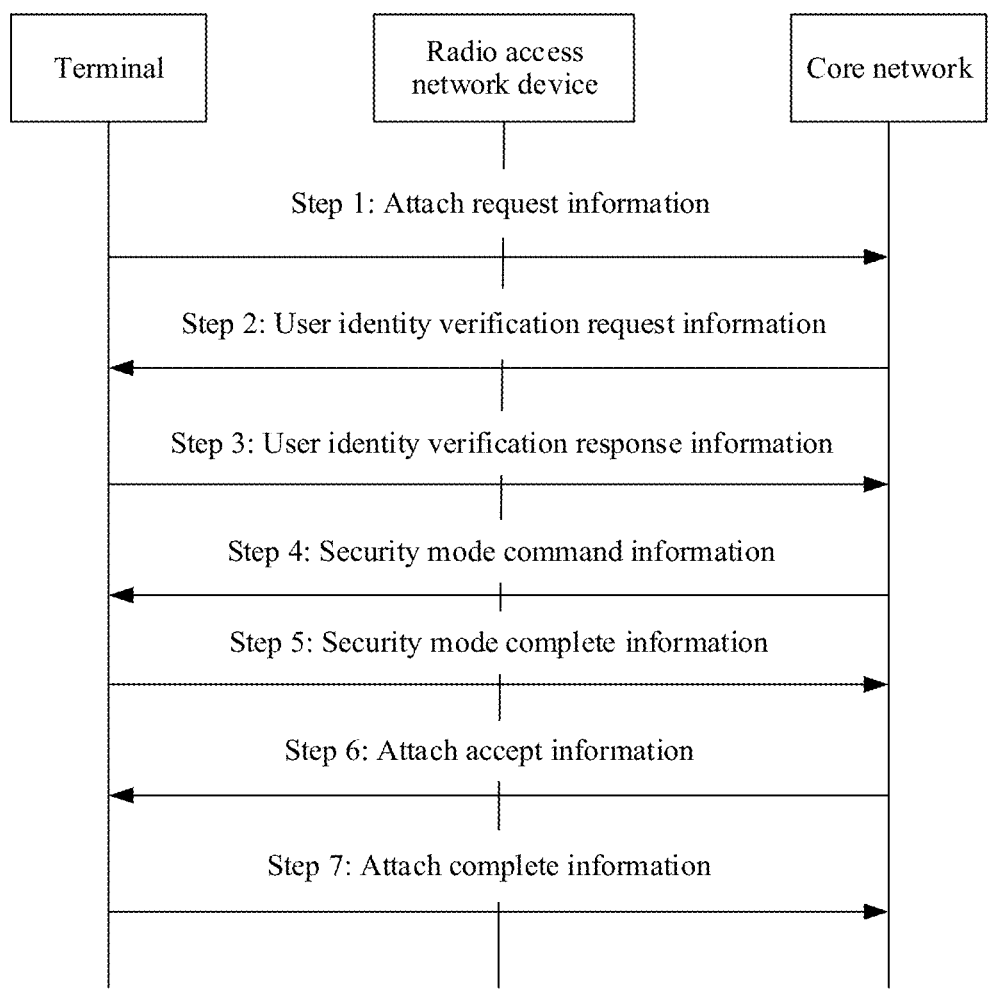
FIG. 3 is a schematic diagram of an information exchange procedure in a communications system according to the prior art.

Further, to clarify advantages of the solutions disclosed in the embodiments of this application, the following describes an information exchange method usually used in the prior art. FIG. 3 is a schematic diagram of an information exchange procedure in the prior art. In the prior art, when a terminal device accesses a core network device for the first time, the following information exchange procedure is usually included:

Step 1: The terminal device generates attach request information carrying an IMSI of the terminal, and transmits the attach request information to the core network device by using a radio access network device.

Step 2: After receiving the attach request information sent by the terminal device, the core network device obtains the IMSI included in the attach request information, and then sends user identity verification request information to the terminal device by using the radio access network device, where the user identity verification request information includes a core network authentication code and a core network random number that is generated by the core network device.

Step 3: After receiving the user identity verification request information sent by the core network device, the terminal device performs identity authentication on the core network based on the core network authentication code included in the user identity verification request information. If determining that the identity of the core network device is valid, the terminal device generates, by using a preset root key, a terminal random number generated by the terminal device, and the core network random number, a key used to encrypt subsequent information. Then, the terminal device generates user identity verification response information, and transmits the user identity verification response information to the core network device by using the radio access network device, where the user identity verification response information includes a terminal authentication code and the terminal random number. That is, in this step, the terminal device can perform identity authentication on the core network device, and generate the key used for encryption.

Step 4: After receiving the user identity verification response information sent by the terminal device, the core network device performs identity authentication on the terminal device based on the terminal authentication code included in the user identity verification response information. If determining that the identity of the terminal device is valid, the core network device generates, by using a preset root key, a terminal random number, and a core network random number, a key used to encrypt subsequent information. If the terminal device is allowed to access the core network device, the root key preset in the core network is the same as the root key preset in the terminal, and a manner of generating the key by the core network is the same as a manner of generating the key by the terminal. In this case, the key generated by the core network device is the same as the key generated by the terminal device. After generating the key, the core network device selects an integrity algorithm and an encryption algorithm, and generates security mode command information, where the security mode command information includes the integrity algorithm and the encryption algorithm that are selected by the core network device. In addition, after performing integrity protection on the security mode command information by using the integrity algorithm, the core network device transmits the security mode command information to the terminal by using the radio access network device. That is, in this step, the core network device can perform identity authentication on the terminal, and generate the key that is used for encryption.

Step 5: After receiving the security mode command information transmitted by the core network device, the terminal device determines whether the terminal device supports the integrity algorithm and the encryption algorithm that are selected by the core network device. If the terminal device supports the integrity algorithm and the encryption algorithm that are selected by the core network device, the terminal device performs integrity verification on the security mode command information. If the information passes the integrity verification, the terminal device transmits, to the core network device by using the radio access network device, security mode complete information on which integrity protection and encryption are performed.

Step 6: After receiving the security mode complete information transmitted by the terminal device, the core network device first performs integrity verification on the information, and if the information passes the integrity verification, decrypts the information. Then, the core network device generates attach accept information, and transmits the attach accept information to the terminal device by using the radio access network device.

Step 7: After receiving the attach accept information transmitted by the core network device, the terminal device determines whether the terminal device can access the core network device, and if yes, sends, to the core network device by using the radio access network device, attach complete information on which integrity protection and encryption processing are performed. After receiving the attach complete information transmitted by the terminal, the core network device performs integrity verification and decryption on the attach complete information. If the attach complete information can pass the integrity verification and can be decrypted, the terminal device is allowed to access the core network device, to complete a procedure in which the terminal device accesses the core network device.

In the foregoing steps, both the terminal device and the core network device perform identity authentication on each other, and complete negotiation on the integrity algorithm and the encryption algorithm. Then, when the terminal device and the core network device exchange information again, integrity protection and encryption protection are performed on the exchanged information. This improves security of the communications system.

However, it can be learned from the description of the foregoing steps and the diagram of the information exchange procedure shown in FIG. 3 that security of the communications system can be ensured in the prior art, but information exchange needs to be performed between the terminal device and the core network device for at least seven times, a quantity of times for which information is exchanged is relatively large, and an amount of data of exchanged information is relatively large, resulting in problems of long time consumption for information exchange and high overheads of power consumption of the terminal device in the prior art.

Figure 4:
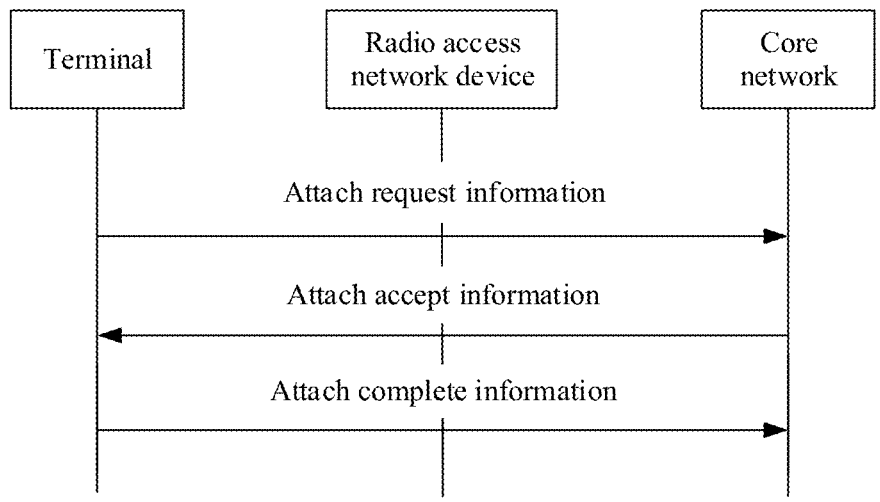
FIG. 4 is a schematic diagram of an information exchange procedure in a communications system according to an embodiment of this application.

However, when the solutions disclosed in the embodiments of this application are used, referring to a schematic diagram of an information exchange procedure shown in FIG. 4, when a terminal device exchanges information with a core network device, the terminal device first transmits attach request information to the core network device. The core network device that receives the attach request information generates attach accept information, obtains a first integrity check code based on the attach accept information, adds the first integrity check code to the attach accept information, and transmits the attach accept information to the terminal device. After receiving the attach accept information, the terminal device obtains a second integrity check code based on the attach accept information, and when the first integrity check code is the same as the second integrity check code, generates and encrypts attach complete information. Then, the terminal device obtains a third integrity check code based on the encrypted attach complete information, adds the third integrity check code to the encrypted attach complete information, and transmits encrypted attach complete information to which the third integrity check code is added to the core network device, so that the core network device determines, based on the received attach complete information, whether to allow the terminal device to access the core network device.

It can be learned from FIG. 4 that in the solution disclosed in this embodiment of this application, only the attach request information, the attach accept information, and the attach complete information need to be transmitted between the terminal device and the core network device. That is, information exchange needs to be performed between the terminal device and the core network device for only three times. Compared with the prior art, a quantity of times for which information is exchanged is reduced, and an amount of data of the exchanged information is reduced. This reduces a time consumed when the information is exchanged between the terminal device and the core network device, and effectively reduces overheads of power consumption of the terminal device.

Further, in step S13, an operation of obtaining, by the terminal device, the second integrity check code based on the attach accept information is disclosed. The operation generally includes the following steps:

First, the terminal device generates a first terminal key by using a preset first key generation algorithm based on a preset first root key, a terminal device parameter, and a core network device parameter that is included in the attach accept information.

Then, the terminal device obtains the second integrity check code by using a preset first integrity algorithm based on the first terminal key and the attach accept information.

In this embodiment of this application, the first root key is preset in the terminal device, and the attach accept information includes the core network device parameter. After receiving the attach accept information, the terminal device generates the first terminal key based on the first root key, the terminal device parameter, the core network device parameter that is included in the attach accept information, and the first key generation algorithm, where the first terminal key is used to generate an integrity check code.

In addition, a third root key is preset in the core network device, and after receiving the attach request information transmitted by the terminal device, the core network device can generate a first core network key by using a third key generation algorithm based on the third root key, the core network device parameter, and the terminal device parameter that is included in the attach request information, where the first core network key is used to generate an integrity check code.

In this case, if the terminal device is allowed to access the core network device, based on a preset setting, the first root key is the same as the third root key, and the first key generation algorithm is the same as the second key generation algorithm. In addition, both a process of calculating the first terminal key and a process of calculating the first core network key are performed based on the terminal device parameter and the core network device parameter. Therefore, the first terminal key obtained through calculation is the same as the first core network key obtained through calculation.

Further, the first integrity algorithm is preset in the terminal device, and the attach accept information is calculated by using the first integrity algorithm and the first terminal key, so that the second integrity check code can be obtained. A second integrity algorithm is preset in the core network device, and the attach accept information is calculated by using the second integrity algorithm and the first core network key, so that the first integrity check code can be obtained. If the terminal device is allowed to access the core network device, the first integrity algorithm is preset to be the same as the second integrity algorithm.

The first terminal key is the same as the first core network key, the first integrity algorithm is the same as the second integrity algorithm, and in both a process of calculating the first integrity check code and a process of calculating the second integrity check code, the attach accept information is calculated. Therefore, when the identity of the core network device is valid, the first integrity check code is the same as the second integrity check code. In this case, the terminal device can determine, by comparing whether the first integrity check code is the same as the second integrity check code, whether the identity of the core network device is valid.

In addition, in this embodiment of this application, the terminal device generates the first terminal key based on the first root key, the terminal device parameter, and the core network device parameter. The terminal device parameter usually includes a terminal device identity and a terminal random number that is generated by the terminal device. The terminal device identity can function to distinguish between different terminal devices. Therefore, terminal device identities of the different terminal devices are different, and first terminal keys generated by the different terminal devices are different, so that the first terminal keys generated by the different terminal devices can be distinguished.

The terminal device identity may be an international mobile subscriber identity (IMSI) of the terminal device. Certainly, another parameter that can distinguish between different terminal devices may alternatively be used as the terminal device identity. This is not limited in this embodiment of this application.

In addition, the terminal random number is a piece of data randomly generated by the terminal device. Using the terminal random number as the terminal device parameter can ensure that the terminal device parameter is not easily spoofed. This improves security of the terminal device parameter, and further improves security of obtaining the first terminal key.

The core network device parameter may be in a plurality of forms. In one form, the core network device parameter includes a core network device identity and a core network random number that is generated by the core network device. The core network device identity is used to distinguish between different core network devices. Therefore, when the terminal device exchanges information with the different core network devices, core network device identities in core network device parameters are different, so that first terminal keys generated by the terminal device are different. Therefore, the first terminal keys generated when the terminal device exchanges the information with the different core network devices can be distinguished.

In this embodiment of this application, different core network labels may be pre-allocated to core network devices, and the core network devices are distinguished by using the core network labels. In this case, the core network label may be used as the core network device identity. Certainly, another parameter that can distinguish between different core network devices may alternatively be used as the core network device identity. This is not limited in this embodiment of this application.

In addition, the core network random number is a piece of data randomly generated by the core network device, and is not easily attacked by capturing data for a plurality of times. Using the core network random number as the core network device parameter can ensure that the core network device parameter is not easily spoofed. This improves security of the core network device parameter, and further improves security of obtaining the first terminal key.

In this embodiment of this application, the terminal device generates the first terminal key by using the first key generation algorithm. The first key generation algorithm may be a key generation algorithm in a plurality of forms. For example, the first key generation algorithm may be an HMAC-SHA-256 algorithm. The HMAC-SHA-256 algorithm includes the following formulas:

Derived Key=HMAC-*SHA*-256(RootKey,*S*)   formula (1); and

*S*=*FC*‖Algorithm Type Distinguisher‖*L*0‖NET ID‖*L*1‖NET Rand‖*L*2‖IMSI‖*L*3‖UE Rand‖*L*4   formula (2).

If the HMAC-SHA-256 algorithm is used to calculate the first terminal key, in formula (1), Derived Key is the first terminal key, RootKey is the first root key of the terminal device, and S is the key calculation parameter. A length of a character output by using the formula is usually 256 bits. In this embodiment of this application, lower 128 bits thereof may be used as the first terminal key.

In addition, in formula (2) used to obtain the key calculation parameter S, FC is a preset value. Generally, FC=0x015. Certainly, FC may alternatively be set to another value. Algorithm Type Distinguisher is a preset value. For example, when the first terminal key is calculated, Algorithm Type Distinguisher=0x02 may be set. NET ID is a core network label used as the core network device identity. L0 is a byte length of Algorithm Type Distinguisher. L1 is a byte length of NET ID. NET Rand is the core network random number. L2 is a byte length of the core network random number NET Rand. IMSI is an international mobile subscriber identity of the terminal device that is used as the terminal device identity. L3 is a byte length of IMSI. UE Rand is the terminal random number. L4 is a byte length of the terminal random number UE Rand.

In this case, a value of S may be obtained by using formula (2), and then the value of S is substituted into formula (1) to obtain the first terminal key through calculation.

Certainly, a key generation algorithm in another form may alternatively be used. This is not limited in this embodiment of this application.

Figure 5:
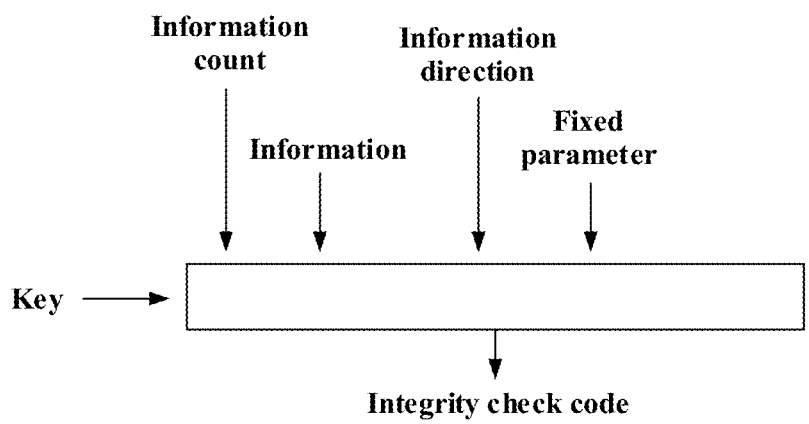
FIG. 5 is a schematic diagram of an integrity algorithm applied to a communications system according to an embodiment of this application.

In addition, the terminal device obtains the second integrity check code by using the preset first integrity algorithm based on the first terminal key and the attach accept information. The first integrity algorithm may be in a plurality of forms. For example, the first integrity algorithm may use AES-128-CMAC. A schematic algorithm diagram thereof is shown in FIG. 5. In this algorithm, an integrity check code is obtained through calculation based on an information count, information, an information direction, a fixed-value parameter, and a key that is used for integrity protection. The information is information applied when the integrity check code is calculated, and when the second integrity check code is calculated, the information is the attach accept information. In addition, if the information direction of the applied information is uplink, a value of the information direction is usually set to 0; or if the information direction of the applied information is downlink, a value of the information direction is usually set to 1. A value of the fixed-value parameter is usually set to 0.

Certainly, another integrity algorithm may alternatively be used. This is not limited in this embodiment of this application.

In step S14 in this embodiment of this application, an operation of obtaining, by the terminal device, encrypted attach complete information is disclosed. The obtaining, by the terminal device, encrypted attach complete information includes the following steps:

First, the terminal device generates a second terminal key by using a preset second key generation algorithm based on a preset second root key, a terminal device parameter, and a core network device parameter that is included in the attach accept information. Then, after generating attach complete information, the terminal device encrypts the attach complete information by using the preset first encryption and decryption algorithm based on the second terminal key.

In this embodiment of this application, the second root key is preset in the terminal device, and the attach accept information includes the core network device parameter. After receiving the attach accept information, the terminal device obtains the core network device parameter, and then generates the second terminal key based on the second root key, the terminal device parameter, the core network device parameter, and the second key generation algorithm, where the second terminal key is used to encrypt and protect exchanged information.

In addition, a fourth root key is preset in the core network device. After receiving the attach request information transmitted by the terminal device, the core network device generates a second core network key by using a fourth key generation algorithm based on the fourth root key, the core network device parameter, and a terminal device parameter that is included in the attach request information, where the second core network key is used to encrypt and protect exchanged information.

In this case, if the terminal device is allowed to access the core network device, it is preset that the second root key is the same as the fourth root key, and the second key generation algorithm is the same as the fourth key generation algorithm. In addition, both a process of calculating the second terminal key and a process of calculating the second core network key are performed based on the terminal device parameter and the core network device parameter. Therefore, the second terminal key is the same as the second core network key.

Further, the first encryption and decryption algorithm is preset in the terminal device, so that the attach complete information is encrypted by using the first encryption and decryption algorithm. The second encryption and decryption algorithm is preset in the core network device, so that the attach complete information is decrypted by using the second encryption and decryption algorithm. If the terminal device is allowed to access the core network device, the first encryption and decryption algorithm is preset to be the same as the second encryption and decryption algorithm, so that the core network device can decrypt information encrypted by the terminal device.

In addition, in this embodiment of this application, the terminal device generates the second terminal key based on the second root key, the terminal device parameter, and the core network device parameter. The terminal device parameter usually includes a terminal device identity and a terminal random number that is generated by the terminal device. The terminal device identity can function to distinguish between different terminal devices, and terminal device identities of the different terminal devices are different. Therefore, second terminal keys generated by the different terminal devices are different, so that the second terminal keys generated by the different terminal devices can be distinguished.

The terminal device identity may be an international mobile subscriber identity (IMSI) of the terminal device. Certainly, another parameter that can distinguish between different terminal devices may alternatively be used as the terminal device identity. This is not limited in this embodiment of this application.

In addition, the terminal random number is a piece of data randomly generated by the terminal device. Using the terminal random number as the terminal device parameter can ensure that the terminal device parameter is not easily spoofed. This improves security of the terminal device parameter, and further improves security of obtaining the second terminal key.

The core network device parameter may be in a plurality of forms. In one form, the core network device parameter includes a core network device identity and a core network random number that is generated by the core network device. The core network device identity is used to function to distinguish between different core network devices. Therefore, when the terminal device exchanges information with different core network devices, core network device identities in core network device parameters are different, so that second terminal keys generated by the terminal device are different. Therefore, the second terminal keys generated when the terminal device exchanges the information with the different core network devices can be distinguished.

In this embodiment of this application, different core network labels may be pre-allocated to core network devices, and the core network devices are distinguished by using the core network labels. In this case, the core network label may be used as the core network device identity. Certainly, another parameter that can distinguish between different core network devices may alternatively be used as the core network device identity. This is not limited in this embodiment of this application.

In addition, the core network random number is a piece of data randomly generated by the core network device, and is not easily attacked by capturing data for a plurality of times. Using the core network random number as the core network device parameter can ensure that the core network device parameter is not easily spoofed. This improves security of the core network device parameter, and further improves security of obtaining the second terminal key.

The terminal device generates the second terminal key by using the second key generation algorithm. The second key generation algorithm may be a key generation algorithm in a plurality of forms. For example, the second key generation algorithm may alternatively be an HMAC-SHA-256 algorithm. In other words, the second terminal key may be calculated by using formula (1) and formula (2).

Derived Key is the second terminal key, RootKey is the first root key in the terminal device, and S is a key calculation parameter. A length of a character output by using the formula is usually 256 bits. In this embodiment of this application, lower 128 bits thereof may be used as the second terminal key.

In addition, in formula (2) used to obtain the key calculation parameter S, FC is a preset value. Generally, FC=0x015. Certainly, FC may alternatively be set to another value. Algorithm Type Distinguisher is a preset value. For example, when the second terminal key is calculated, Algorithm Type Distinguisher=0x01 may be set. NET ID is a core network label used as the core network device identity. L0 is a byte length of Algorithm Type Distinguisher. L1 is a byte length of NET ID. NET Rand is the core network random number. L2 is a byte length of the core network random number NET Rand. IMSI is an international mobile subscriber identity of the terminal device that is used as the terminal device identity. L3 is a byte length of IMSI. UE Rand is the terminal random number. L4 is a byte length of the terminal random number UE Rand.

Certainly, a key generation algorithm in another form may alternatively be used. This is not limited in this embodiment of this application.

Further, to improve security of the communications system, the first root key and the second root key that are preset in the terminal device may be encrypted. When necessary, the terminal device decrypts the first root key and the second root key. Then, the terminal device respectively generates the first terminal key by using the decrypted first root key, and generates the second terminal key by using the decrypted second root key. Encryption and decryption manners of the first root key and the second root key may be the same or may be different. This is not limited in this embodiment of this application.

In addition, the first root key and the second root key may be a same root key, to be specific, the terminal device generates the first terminal key and the second terminal key by using the same root key, or the first root key and the second root key are different root keys. This is not limited in this embodiment of this application.

In this embodiment of this application, both the attach accept information and the attach complete information include an integrity check code. In this case, some information structures of the attach accept information and the attach complete information may be shown in the following table.

| 8 | 7 | 6 | 5 | 4 | 3 | 2 | 1 | |
|---|---|---|---|---|---|---|---|---|
| Sec Hdr Type | | | Reserved | | | | | Oct 1 |
| | | | MAC | | | | | Oct 2 |
| | | | MAC | | | | | Oct 3 |
| | | | MAC | | | | | Oct 4 |
| | | | MAC | | | | | Oct 5 |
| | | | Sequence number | | | | | Oct 6 |

"Sec Hdr Type" is used to indicate a security type of the piece of information. In this embodiment of this application, if a preset value (for example, 11) is set in the "Sec Hdr Type" field, it indicates that integrity protection is performed on the piece of information, and an integrity check code is set in the piece of information. "Reserved" is a reserved field. The "MAC" field forms a 32-bit integrity check code. Sequence number indicates an information count.

Correspondingly, this application discloses an information exchange method in a second embodiment. The method is applied to a core network device. The core network device may exchange information with a terminal device by using a radio access network device. The terminal device can perform the information exchange method disclosed in the first embodiment of this application. Therefore, when the core network device performs the information exchange method disclosed in the second embodiment of this application, for an operation performed by the terminal device, refer to content disclosed in the first embodiment of this application.

Figure 6:
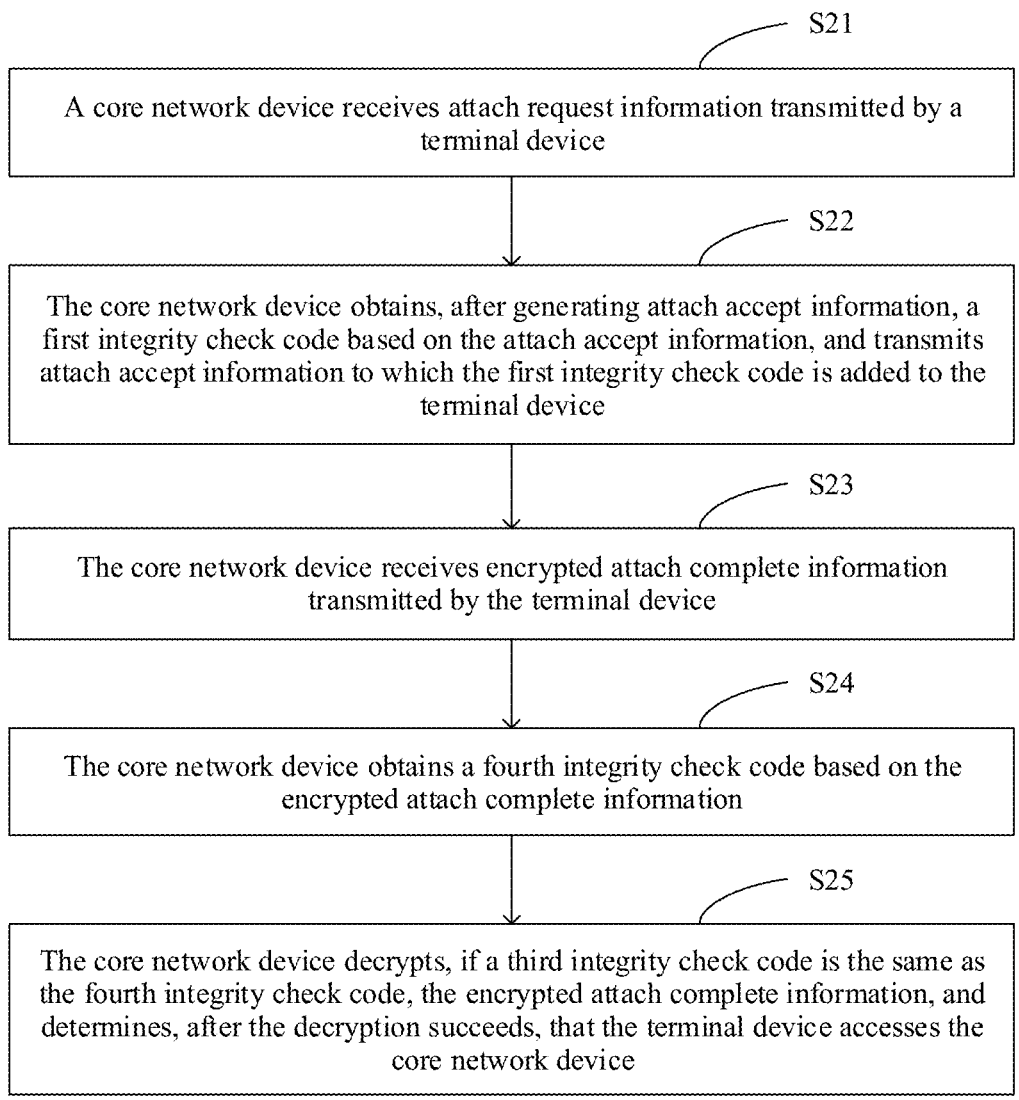
FIG. 6 is a schematic diagram of a working procedure of another information exchange method according to an embodiment of this application.

Referring to a schematic diagram of a working procedure shown in FIG. 6, the information exchange method disclosed in this embodiment of this application includes:

Step S21: A core network device receives attach request information transmitted by a terminal device.

When the terminal device needs to access the core network device, the terminal device generates the attach request information, and transmits the attach request information to the radio access network device, and then the radio access network device transmits the attach request information to the core network device, so that the core network device can receive the attach request information.

In addition, the attach request information may include a terminal device parameter. The terminal device parameter usually includes a terminal device identity and a terminal random number that is generated by the terminal device. The terminal device identity can function to distinguish between different terminal devices, and may be an international mobile subscriber identity (IMSI) of the terminal device.

Step S22: The core network device obtains, after generating attach accept information, a first integrity check code based on the attach accept information, and transmitting attach accept information to which the first integrity check code is added to the terminal device.

A second integrity algorithm is preset in the core network device. After receiving the attach request information, the core network device can calculate the attach accept information based on the preset second integrity algorithm, to obtain the corresponding first integrity check code. Then, the core network device adds the first integrity check code to the attach accept information, and transmits the attach accept information to which the first integrity check code is added to the terminal device by using the radio access network device.

Step S23: The core network device receives encrypted attach complete information transmitted by the terminal device, where the attach complete information includes a third integrity check code of the terminal device.

After receiving the attach accept information, the terminal device calculates the attach accept information, to obtain a second integrity check code. When calculating the attach accept information, the terminal device usually performs calculation based on a preset first integrity algorithm. In addition, the core network device calculates the attach accept information by using the preset second integrity algorithm, to obtain the first integrity check code. If the terminal device is allowed to access the core network device, the first integrity algorithm is preset to be the same as the second integrity algorithm. That is, the terminal device and the core network device perform integrity verification by using the same integrity algorithm.

In this case, if the first integrity check code is the same as the second integrity check code, the terminal device determines that an identity of the core network device is valid. That is, in this embodiment of this application, the terminal device performs identity authentication on the core network device by using the integrity check code.

After determining that the identity of the core network device is valid (that is, the first integrity check code is the same as the second integrity check code), the terminal device generates the attach complete information, and then encrypts the attach complete information, to obtain the encrypted attach complete information. Then, the terminal device calculates the encrypted attach complete information by using the first integrity algorithm, to obtain the third integrity check code, then adds the third integrity check code to the encrypted attach complete information, and transmits attach complete information to which the third integrity check code is added to the core network device by using the radio access network device.

Step S24: The core network device obtains a fourth integrity check code based on the encrypted attach complete information.

In this step, the core network device can calculate, after receiving the attach complete information, the attach complete information based on the second integrity algorithm, to obtain the fourth integrity check code.

Step S25: The core network device decrypts the encrypted attach complete information if the third integrity check code is the same as the fourth integrity check code, and after the decryption succeeds, determines that the terminal device accesses the core network device.

If determining that the third integrity check code is the same as the fourth integrity check code, the core network device may determine that an identity of the terminal device is valid. That is, the core network device implements identity authentication on the terminal device by using the third integrity check code included in the attach complete information.

In addition, the terminal device encrypts the attach complete information, to improve security of the attach complete information. In addition, the terminal device usually encrypts the attach complete information by using a preset first encryption and decryption method, and after receiving the attach complete information, the core network device decrypts the attach complete information by using a preset second encryption and decryption method. If the terminal device is allowed to access the core network device, the first encryption and decryption method is preset to be the same as the second encryption and decryption method.

In this case, after determining, based on the integrity check code, that the identity of the terminal device is valid, if the core network device can decrypt the attach complete information based on the second encryption and decryption method, it indicates that the terminal device and the core network device can mutually encrypt and decrypt information exchanged therebetween. In this case, it is determined that the terminal device accesses the core network device.

Further, after the terminal device accesses the core network device, the terminal device and the core network device can continue to exchange information. For example, the terminal device transmits obtained detection data to the core network device by using the radio access network device, and the core network device transmits instruction information and the like to the terminal device by using the radio access network device. In this case, each time information is exchanged, an information transmit end may add, to the exchanged information, an integrity check code obtained through calculation based on the information, and encrypt the information. A receive end that receives the information calculates the information to obtain a corresponding integrity check. If the integrity check code obtained through calculation is the same as the integrity check code added to the information, the receive end may determine that the received information is complete, and after determining that the received information is complete, may perform decryption based on a preset encryption and decryption algorithm. This improves security of a communications system.

This embodiment of this application discloses the information exchange method. In the method, after receiving the attach request information transmitted by the terminal device, the core network device generates the attach accept information, obtains the first integrity check code based on the attach accept information, adds the first integrity check code to the attach accept information, and then transmits the attach accept information to the terminal device. The terminal device receives the attach accept information transmitted by the core network device, and obtains the second integrity check code based on the attach accept information. If the first integrity check code is the same as the second integrity check code, the terminal device determines that the identity of the core network device is valid, that is, the terminal device implements identity authentication on the core network by using the first integrity check code included in the attach accept information. In this case, the terminal device generates the attach complete information and encrypts the attach complete information. Then, the terminal device obtains the third integrity check code based on the encrypted attach complete information, adds the third integrity check code to the encrypted attach complete information, and then transmits encrypted attach complete information to which the third integrity check code is added to the core network device. After receiving the attach complete information, the core network device obtains the fourth integrity check code based on the attach complete information. If the third integrity check code is the same as the fourth integrity check code, the core network device determines that the identity of the terminal device is valid, that is, the core network device implements identity authentication on the terminal device by using the fourth integrity check code included in the attach complete information. Then, the core network device decrypts the attach complete information, and if the decryption succeeds, determines that the terminal device accesses the core network device.

Referring to the schematic diagram of the information exchange procedure shown in FIG. 4, according to the information exchange method disclosed in this embodiment of this application, only the attach request information, the attach accept information, and the attach complete information need to be transmitted between the terminal device and the core network device, that is, the terminal device and the core network device can implement identity authentication on each other and data protection by performing information exchange for only three times.

Compared with the prior art, according to the solutions disclosed in the embodiments of this application, data exchange procedures are reduced while security of the communications system is ensured. In addition, an amount of data of the information exchanged between the terminal device and the core network device is reduced. This reduces a time consumed for information exchange between the terminal device and the core network device, and reduces overheads of power consumption of the terminal device.

Further, in step S22, an operation of obtaining, by the core network device after generating the attach accept information, the first integrity check code based on the attach accept information is disclosed. The obtaining the first integrity check code based on the attach accept information includes the following steps:

First, the core network device generates a first core network key by using a preset third key generation algorithm based on a preset third root key, a core network device parameter, and a terminal device parameter that is included in the attach request information. Then, the core network device obtains the first integrity check code by using the preset second integrity algorithm based on the first core network key and the attach accept information.

In this embodiment of this application, a first root key is preset in the terminal device, and the attach accept information includes the core network device parameter. After receiving the attach accept information, the terminal device generates the first terminal key based on the first root key, the terminal device parameter, the core network device parameter that is included in the attach accept information, and the first key generation algorithm, where the first terminal key is used to generate an integrity check code.

Correspondingly, the third root key is preset in the core network device. In addition, after receiving the attach request information transmitted by the terminal device, the core network device can generate the first core network key by using the third key generation algorithm based on the third root key, the core network device parameter, and the terminal device parameter that is included in the attach request information, where the first core network key is used to generate an integrity check code.

In this case, if the terminal device is allowed to access the core network device, based on a preset setting, the first root key is the same as the third root key, and the first key generation algorithm is the same as the second key generation algorithm. In addition, both a process of calculating the first terminal key and a process of calculating the first core network key are performed based on the terminal device parameter and the core network device parameter. Therefore, the first terminal key obtained through calculation is the same as the first core network key obtained through calculation.

Further, the first integrity algorithm is preset in the terminal device, and the attach accept information is calculated by using the first integrity algorithm, so that the second integrity check code can be obtained. The second integrity algorithm is preset in the core network device, and the attach accept information is calculated by using the second integrity algorithm, so that the first integrity check code can be obtained. If the terminal device is allowed to access the core network device, the first integrity algorithm is preset to be the same as the second integrity algorithm.

The first terminal key is the same as the first core network key, the first integrity algorithm is the same as the second integrity algorithm, and in both a process of calculating the first integrity check code and a process of calculating the second integrity check code, the attach accept information is calculated. Therefore, when the identity of the core network device is valid, the first integrity check code is the same as the second integrity check code. In this case, the terminal device can determine, by comparing whether the first integrity check code is the same as the second integrity check code, whether the identity of the core network device is valid.

In addition, in this embodiment of this application, the core network device generates the first core network key based on the third root key, the core network device parameter, and the terminal device parameter. The terminal device parameter usually includes a terminal device identity and a terminal random number that is generated by the terminal device. The terminal device identity can function to distinguish between different terminal devices, and terminal device identities of the different terminal devices are different. Therefore, first core network keys generated when the core network device exchanges information with the different terminal devices can be distinguished.

The terminal device identity may be an international mobile subscriber identity (IMSI) of the terminal device. Certainly, another parameter that can distinguish between different terminal devices may alternatively be used as the terminal device identity. This is not limited in this embodiment of this application.

In addition, the terminal random number is a piece of data randomly generated by the terminal device. Using the terminal random number as the terminal device parameter can ensure that the terminal device parameter is not easily spoofed. This improves security of the terminal device parameter, and further improves security of obtaining the first core network key.

The core network device parameter may be in a plurality of forms. In one form, the core network device parameter includes a core network device identity and a core network random number that is generated by the core network device. The core network device identity is used to function to distinguish between different core network devices. Therefore, first core network keys generated by the different core network devices are different, so that the first core network keys generated by the different core network devices can be distinguished.

In this embodiment of this application, different core network labels may be pre-allocated to core network devices, and the core network devices are distinguished by using the core network labels. In this case, the core network label may be used as the core network device identity. Certainly, another parameter that can distinguish between different core network devices may alternatively be used as the core network device identity. This is not limited in this embodiment of this application.

In addition, the core network random number is a piece of data randomly generated by the core network device, and is not easily attacked by capturing data for a plurality of times. Using the core network random number as the core network device parameter can ensure that the core network device parameter is not easily spoofed. This improves security of the core network device parameter, and further improves security of obtaining the first core network key.

In this embodiment of this application, the core network device generates the first core network key by using the third key generation algorithm. The third key generation algorithm may be a key generation algorithm in a plurality of forms. For example, the third key generation algorithm may be an HMAC-SHA-256 algorithm. In other words, the core network device may generate the first core network key based on formula (1) and formula (2).

The core network device calculates the first core network key by using the HMAC-SHA-256 algorithm. In this case, in formula (1), Derived Key is the first core network key, RootKey is the third root key in the core network device, and S is a key calculation parameter. A length of a character output by using formula (1) is usually 256 bits. In this embodiment of this application, lower 128 bits thereof may be used as the first core network key. In addition, in formula (2) used to obtain the key calculation parameter S, FC is a preset value. Generally, FC=0x015. Certainly, FC may alternatively be set to another value. A specific value of Algorithm Type Distinguisher is the same as a specific value set when the first terminal key is calculated. For example, when the first terminal key is calculated, Algorithm Type Distinguisher=0x02. Correspondingly, when the first core network key is calculated, Algorithm Type Distinguisher=0x02. NET ID is a core network label used as the core network device identity. L0 is a byte length of Algorithm Type Distinguisher. L1 is a byte length of the core network label NET ID. NET Rand is the core network random number. L2 is a byte length of the core network random number NET Rand. IMSI is an international mobile subscriber identity of the terminal device that is used as the terminal device identity. L3 is a byte length of IMSI. UE Rand is the terminal random number. L4 is a byte length of the terminal random number UE Rand.

In this case, a value of S may be obtained by using formula (2), and then the value of S is substituted into formula (1) to obtain the first core network key through calculation.

Certainly, a key generation algorithm in another form may alternatively be used. This is not limited in this embodiment of this application.

In addition, the core network device obtains the first integrity check code by using the preset second integrity algorithm based on the first core network key and the attach accept information. The second integrity algorithm may be in a plurality of forms. For example, the second integrity algorithm may use AES-128-CMAC. A schematic algorithm diagram thereof is shown in FIG. 5. In this algorithm, an integrity check code can be obtained through calculation based on an information count, information, an information direction, a fixed-value parameter, and a key that is used for integrity protection. The information is information applied when the integrity check code is calculated, and when the first integrity check code is calculated, the information is the attach accept information. In addition, if the information direction of the applied information is uplink, a value of the information direction is usually set to 0; or if the information direction of the applied information is downlink, a value of the information direction is usually set to 1. A value of the fixed-value parameter is usually set to 0.

Certainly, another integrity algorithm may alternatively be used. This is not limited in this embodiment of this application.

Further, in step S25 in this embodiment of this application, an operation of decrypting, by the core network device, the encrypted attach complete information is disclosed. The decrypting, by the core network device, the encrypted attach complete information usually includes the following steps:

First, the core network device generates a second core network key by using a preset fourth key generation algorithm based on a preset fourth root key, a core network device parameter, and a terminal device parameter that is included in the attach request information. Then, the core network device decrypts the encrypted attach complete information by using the preset second encryption and decryption algorithm based on the second core network key.

In this embodiment of this application, a second root key is preset in the terminal device, and the attach request information includes the terminal device parameter. After receiving the attach accept information, the terminal device obtains the core network device parameter, and then generates the second terminal device key based on the second root key, the terminal device parameter, the core network device parameter, and the second key generation algorithm, where the second terminal device key is used to encrypt and protect exchanged information.

In addition, a fourth root key is preset in the core network device, and after receiving the attach request information transmitted by the terminal device, the core network device generates the second core network device key by using the fourth key generation algorithm based on the fourth root key, the core network device parameter, and the terminal device parameter that is included in the attach request information, where the second core network device key is used to encrypt and protect exchanged information.

In this case, if the terminal device is allowed to access the core network device, it is preset that the second root key is the same as the fourth root key, and the second key generation algorithm is the same as the fourth key generation algorithm. In addition, both a process of calculating the second terminal device key and a process of calculating the second core network device key are performed based on the terminal device parameter and the core network device parameter. Therefore, the second terminal device key is the same as the second core network device key.

Further, the first encryption and decryption algorithm is preset in the terminal device, so that the attach complete information is encrypted by using the first encryption and decryption algorithm. The second encryption and decryption algorithm is preset in the core network device, so that the attach complete information is decrypted by using the second encryption and decryption algorithm. If the terminal device is allowed to access the core network device, the first encryption and decryption algorithm is preset to be the same as the second encryption and decryption algorithm, so that the core network device can decrypt information encrypted by the terminal device.

In addition, in this embodiment of this application, the core network device generates the second core network key based on the fourth root key, the core network device parameter, and the terminal device parameter. The terminal device parameter usually includes a terminal device identity and a terminal random number that is generated by the terminal device. The terminal device identity can function to distinguish between different terminal devices, and terminal device identities of the different terminal devices are different. Therefore, second core network keys generated when the core network device exchanges information with the different terminal devices can be distinguished.

The terminal device identity may be an international mobile subscriber identity (international mobile subscriber identity, IMSI) of the terminal device. Certainly, another parameter that can distinguish between different terminal devices may alternatively be used as the terminal device identity. This is not limited in this embodiment of this application.

In addition, the terminal random number is a piece of data randomly generated by the terminal device. Using the terminal random number as the terminal device parameter can ensure that the terminal device parameter is not easily spoofed. This improves security of the terminal device parameter, and further improves security of obtaining the second core network key.

The core network device parameter may be in a plurality of forms. In one form, the core network device parameter includes a core network device identity and a core network random number that is generated by the core network device. The core network device identity is used to function to distinguish between different core network devices. Therefore, second core network keys generated by the different core network devices are different, so that the second core network keys generated by the different core network devices can be distinguished.

In this embodiment of this application, different core network labels may be pre-allocated to core network devices, and the core network devices are distinguished by using the core network labels. In this case, the core network label may be used as the core network device identity. Certainly, another parameter that can distinguish between different core network devices may alternatively be used as the core network device identity. This is not limited in this embodiment of this application.

In addition, the core network random number is a piece of data randomly generated by the core network device, and is not easily attacked by capturing data for a plurality of times. Using the core network random number as the core network device parameter can ensure that the core network device parameter is not easily spoofed. This improves security of the core network device parameter, and further improves security of obtaining the second core network key.

In the foregoing step, the core network device generates the second core network key by using the fourth key generation algorithm. The fourth key generation algorithm may be a key generation algorithm in a plurality of forms. For example, the fourth key generation algorithm may alternatively be an HMAC-SHA-256 algorithm. In other words, the second core network key may be calculated by using formula (1) and formula (2).

When the second core network key is calculated by using the HMAC-SHA-256 algorithm, Derived Key is the second core network key, RootKey is the fourth root key in the core network device, and S is a key calculation parameter. A length of a character output by using the formula is usually 256 bits. In this embodiment of this application, lower 128 bits thereof may be used as the second core network key.

In addition, in formula (2) used to obtain the key calculation parameter S, FC is a preset value. Generally, FC=0x015. Certainly, FC may alternatively be set to another value. Algorithm Type Distinguisher is a preset value, and a specific value of Algorithm Type Distinguisher is the same as a specific value set when the second terminal key is calculated. For example, when the second terminal key is calculated, Algorithm Type Distinguisher=0x01, and correspondingly, when the second core network key is calculated, Algorithm Type Distinguisher=0x01. NET ID is a core network label used as the core network device identity. L0 is a byte length of Algorithm Type Distinguisher. L1 is a byte length of NET ID. NET Rand is the core network random number. L2 is a byte length of the core network random number NET Rand. IMSI is an international mobile subscriber identity of the terminal device that is used as the terminal device identity. L3 is a byte length of IMSI. UE Rand is the terminal random number. L4 is a byte length of the terminal random number UE Rand.

Certainly, a key generation algorithm in another form may alternatively be used. This is not limited in this embodiment of this application.

Further, to improve security of the communications system, the third root key and the fourth root key may be encrypted. When necessary, the core network device decrypts the third root key and the fourth root key. Then, the core network device respectively generates the first core network key by using the decrypted third root key, and generates the second core network key by using the decrypted fourth root key. When encrypting and decrypting the third root key and the fourth root key, the core network device may use a same encryption and decryption algorithm, or may use different encryption and decryption algorithms. This is not limited in this embodiment of this application.

In addition, the third root key and the fourth root key may be a same root key, that is, the core network device generates the first core network key and the second core network key by using the same root key. Alternatively, the third root key and the fourth root key are respectively different root keys. This is not limited in this embodiment of this application.

Apparatus embodiments of this application are described below, and may be used to perform the method embodiments of this application. For details that are not disclosed in the apparatus embodiments of this application, refer to the method embodiments of this application.

This application discloses an information exchange apparatus in a third embodiment. The apparatus is applied to the terminal device in FIG. 1. The terminal device can exchange information with a core network device by using a radio access network device, and perform the information exchange method disclosed in the first embodiment of this application.

Figure 7:
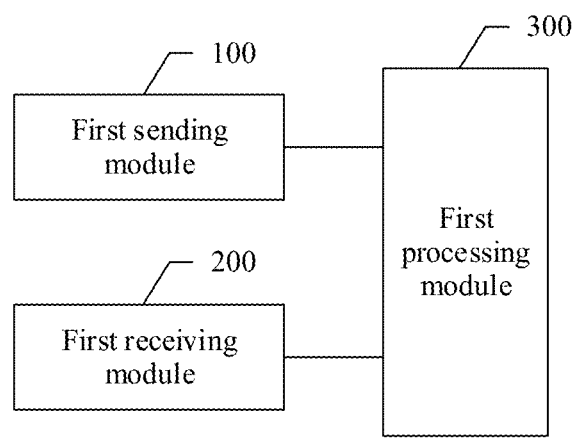
FIG. 7 is a schematic structural diagram of an information exchange apparatus according to an embodiment of this application.

Referring to a schematic structural diagram shown in FIG. 7, the information exchange apparatus disclosed in this embodiment of this application includes a first sending module 100, a first receiving module 200, and a first processing module 300.

The first sending module 100 is configured to transmit attach request information to a core network device. The attach request information may include a terminal device parameter. The terminal device parameter usually includes a terminal device identity and a terminal random number that is generated by the terminal device.

The first receiving module 200 is configured to receive attach accept information transmitted by the core network device, where the attach accept information includes a first integrity check code of the core network device.

After receiving the attach request information, the core network device generates the attach accept information, calculates the attach accept information to obtain the first integrity check code, adds the first integrity check code to the attach accept information, and then transmits attach accept information to which the first integrity check code is added to the terminal device by using the radio access device.

The first processing module 300 is configured to obtain a second integrity check code based on the attach accept information, and the first processing module is configured to, if the first integrity check code is the same as the second integrity check code, obtain encrypted attach complete information, obtain a third integrity check code based on the encrypted attach complete information, and trigger the first sending module to transmit encrypted attach complete information to which the third integrity check code is added to the core network device.

The first processing module 300 usually obtains the second integrity check code through calculation based on the preset first integrity algorithm. In addition, the core network device calculates the attach accept information by using a preset second integrity algorithm, to obtain the first integrity check code. In this case, if the terminal device is allowed to access the core network device, the first integrity algorithm is preset to be the same as the second integrity algorithm.

If the first integrity check code is the same as the second integrity check code, the terminal device determines that an identity of the core network device is valid. After determining that the identity of the core network device is valid, the first processing module 300 generates attach complete information, then encrypts the attach complete information to obtain the encrypted attach complete information, then calculates the encrypted attach complete information by using the first integrity algorithm to obtain the third integrity check code, and then adds the third integrity check code to the encrypted attach complete information.

In this case, after receiving the attach complete information, the core network device can calculate the attach complete information based on the second integrity algorithm, to obtain a fourth integrity check code. In addition, if determining that the third integrity check code is the same as the fourth integrity check code, the core network device may determine that an identity of the terminal device is valid. That is, the core network device implements identity authentication on the terminal device by using the third integrity check code included in the attach complete information. The first integrity algorithm is the same as the second integrity algorithm.

In addition, the first processing module encrypts the attach complete information, and usually encrypts the attach complete information by using a preset first encryption and decryption method. In addition, after receiving the attach complete information, the core network device decrypts the attach complete information by using a preset second encryption and decryption method. If the terminal device is allowed to access the core network device, the first encryption and decryption method is preset to be the same as the second encryption and decryption method. In this case, after determining, based on the integrity check code, that the identity of the terminal device is valid, if the core network device can decrypt the attach complete information based on the second encryption and decryption method, it indicates that the terminal device and the core network device can mutually encrypt and decrypt information exchanged therebetween. In this case, it is determined that the terminal device accesses the core network device.

According to the information exchange apparatus disclosed in this embodiment of this application, only the attach request information, the attach accept information, and the attach complete information need to be transmitted between the terminal device and the core network device. That is, the terminal device and the core network device can implement identity authentication on each other and data protection by performing information exchange for only three times.

Compared with the prior art, according to the solutions disclosed in the embodiments of this application, data exchange procedures are reduced while security of the communications system is ensured. In addition, an amount of data of the information exchanged between the terminal device and the core network device is reduced. This reduces a time consumed for information exchange between the terminal device and the core network device, and reduces overheads of power consumption of the terminal device.

Further, the first processing module is specifically configured to: generate a first terminal key by using a preset first key generation algorithm based on a preset first root key, a terminal device parameter, and a core network device parameter that is included in the attach accept information, and obtain the second integrity check code by using the preset first integrity algorithm based on the first terminal key and the attach accept information.

In this embodiment of this application, the first root key is preset in the terminal device, and the attach accept information includes the core network device parameter. After receiving the attach accept information, the terminal device generates the first terminal key based on the first root key, the terminal device parameter, the core network device parameter that is included in the attach accept information, and the first key generation algorithm, where the first terminal key is used to generate an integrity check code.

In addition, a third root key is preset in the core network device, and after receiving the attach request information transmitted by the terminal device, the core network device can generate a first core network key by using a third key generation algorithm based on the third root key, the core network device parameter, and the terminal device parameter that is included in the attach request information, where the first core network key is used to generate an integrity check code.

In this case, if the terminal device is allowed to access the core network device, based on a preset setting, the first root key is the same as the third root key, and the first key generation algorithm is the same as a second key generation algorithm. In addition, both a process of calculating the first terminal key and a process of calculating the first core network key are performed based on the terminal device parameter and the core network device parameter. Therefore, the first terminal key obtained through calculation is the same as the first core network key obtained through calculation.

Further, the first integrity algorithm is preset in the terminal device, and the attach accept information is calculated by using the first integrity algorithm and the first terminal key, so that the second integrity check code can be obtained. The second integrity algorithm is preset in the core network device, and the attach accept information is calculated by using the second integrity algorithm and the first core network key, so that the first integrity check code can be obtained. If the terminal device is allowed to access the core network device, the first integrity algorithm is preset to be the same as the second integrity algorithm.

The first terminal key is the same as the first core network key, the first integrity algorithm is the same as the second integrity algorithm, and in both a process of calculating the first integrity check code and a process of calculating the second integrity check code, the attach accept information is calculated. Therefore, when the identity of the core network device is valid, the first integrity check code is the same as the second integrity check code. In this case, the terminal device can determine, by comparing whether the first integrity check code is the same as the second integrity check code, whether the identity of the core network device is valid.

Further, the first processing module is specifically configured to: generate a second terminal key by using the preset second key generation algorithm based on a preset second root key, a terminal device parameter, and a core network device parameter that is included in the attach accept information, and encrypt, after generating the attach complete information, the attach complete information by using the preset first encryption and decryption algorithm based on the second terminal key.

In this embodiment of this application, the second root key is preset in the terminal device, and the attach accept information includes the core network device parameter. After receiving the attach accept information, the terminal device obtains the core network device parameter, and then generates the second terminal key based on the second root key, the terminal device parameter, the core network device parameter, and the second key generation algorithm, where the second terminal key is used to encrypt and protect exchanged information.

In addition, a fourth root key is preset in the core network device. After receiving the attach request information transmitted by the terminal device, the core network device generates a second core network key by using a fourth key generation algorithm based on the fourth root key, the core network device parameter, and the terminal device parameter that is included in the attach request information, where the second core network key is used to encrypt and protect exchanged information.

In this case, if the terminal device is allowed to access the core network device, it is preset that the second root key is the same as the fourth root key, and the second key generation algorithm is the same as the fourth key generation algorithm. In addition, both a process of calculating the second terminal key and a process of calculating the second core network key are performed based on the terminal device parameter and the core network device parameter. Therefore, the second terminal key is the same as the second core network key.

Further, the first encryption and decryption algorithm is preset in the terminal device, so that the attach complete information is encrypted by using the first encryption and decryption algorithm. The second encryption and decryption algorithm is preset in the core network device, so that the attach complete information is decrypted by using the second encryption and decryption algorithm. If the terminal device is allowed to access the core network device, the first encryption and decryption algorithm is preset to be the same as the second encryption and decryption algorithm, so that the core network device can decrypt information encrypted by the terminal device.

In addition, in this embodiment of this application, the terminal device parameter usually includes a terminal device identity and a terminal random number that is generated by the terminal device, and the core network device parameter includes a core network device identity and a core network random number that is generated by the core network device.

Correspondingly, this application discloses an information exchange apparatus in a fourth embodiment. The apparatus is applied to a core network device, and the core network device may exchange information with a terminal device by using a radio access network device, and perform the information exchange method disclosed in the second embodiment of this application.

Figure 8:
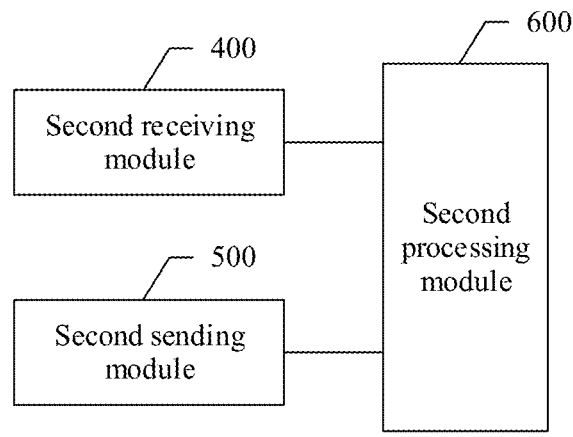
FIG. 8 a schematic structural diagram of another information exchange apparatus according to an embodiment of this application.

Referring to a schematic structural diagram shown in FIG. 8, the information exchange apparatus disclosed in this embodiment of this application includes a second receiving module 400, a second sending module 500, and a second processing module 600.

The second receiving module 400 is configured to receive attach request information transmitted by the terminal device.

When the terminal device needs to access a core network device, the terminal device generates the attach request information, and transmits the attach request information to the second receiving module 400 by using a radio access network device. The attach request information may include a terminal device parameter.

The second processing module 600 is configured to obtain, after generating the attach accept information, a first integrity check code based on the attach accept information, and trigger the second sending module 500 to transmit attach accept information to which the first integrity check code is added to the terminal device.

A second integrity algorithm is preset in the core network device. After receiving the attach request information, the second processing module 600 can calculate the attach accept information based on the preset second integrity algorithm, to obtain the corresponding first integrity check code. Then, the second processing module 600 adds the first integrity check code to the attach accept information, and transmits the attach accept information to which the first integrity check code is added to the terminal device by using the radio access network device.

The second receiving module 400 is further configured to receive encrypted attach complete information transmitted by the terminal device, where the attach complete information includes a third integrity check code of the terminal device.

After receiving the attach accept information, the terminal device calculates the attach accept information, to obtain a second integrity check code. When calculating the attach accept information, the terminal device usually performs calculation based on a preset first integrity algorithm. In addition, the core network device calculates the attach accept information by using the preset second integrity algorithm, to obtain the first integrity check code. If the terminal device is allowed to access the core network device, the first integrity algorithm is preset to be the same as the second integrity algorithm. That is, the terminal device and the core network device perform integrity verification by using the same integrity algorithm. In this case, if the first integrity check code is the same as the second integrity check code, the terminal device determines that an identity of the core network device is valid.

After determining that the identity of the core network device is valid, the terminal device generates the attach complete information, and then encrypts the attach complete information, to obtain the encrypted attach complete information. Then, the terminal device calculates the encrypted attach complete information by using the first integrity algorithm, to obtain the third integrity check code, then adds the third integrity check code to the encrypted attach complete information, and transmits attach complete information to which the third integrity check code is added to the core network device by using the radio access network device, so that the core network device obtains the attach complete information by using the second receiving module 400.

The second processing module 600 is further configured to obtain a fourth integrity check code based on the encrypted attach complete information, and the second processing module 600 is configured to: decrypt the encrypted attach complete information if the third integrity check code is the same as the fourth integrity check code, and after the decryption succeeds, determine that the terminal device accesses the core network device.

The second processing module 600 can calculate the attach complete information based on the second integrity algorithm, to obtain the fourth integrity check code. If the third integrity check code is determined to be the same as the fourth integrity check code, it may be determined that an identity of the terminal device is valid.

In addition, the terminal device encrypts the attach complete information, to improve security of the attach complete information. In addition, the terminal device usually encrypts the attach complete information by using a preset first encryption and decryption method, and after receiving the attach complete information, the core network device decrypts the attach complete information by using a preset second encryption and decryption method. If the terminal device is allowed to access the core network device, the first encryption and decryption method is preset to be the same as the second encryption and decryption method.

In this case, after determining, based on the integrity check code, that the identity of the terminal device is valid, if the core network device can decrypt the attach complete information based on the second encryption and decryption method, it indicates that the terminal device and the core network device can mutually encrypt and decrypt information exchanged therebetween. In this case, it is determined that the terminal device accesses the core network device.

Compared with the prior art, according to the solutions disclosed in the embodiments of this application, data exchange procedures are reduced while security of the communications system is ensured. In addition, an amount of data of the information exchanged between the terminal device and the core network device is reduced. This reduces a time consumed for information exchange between the terminal device and the core network device, and reduces overheads of power consumption of the terminal device.

Further, in this embodiment of this application, the second processing module is specifically configured to: generate a first core network key by using a preset third key generation algorithm based on a preset third root key, a core network device parameter, and a terminal device parameter that is included in the attach request information, and obtain the first integrity check code by using the preset second integrity algorithm based on the first core network key and the attach accept information.

In this embodiment of this application, a first root key is preset in the terminal device, and the attach accept information includes the core network device parameter. After receiving the attach accept information, the terminal device generates a first terminal key based on the first root key, a terminal device parameter, a core network device parameter that is included in the attach accept information, and a first key generation algorithm, where the first terminal key is used to generate an integrity check code.

Correspondingly, the third root key is preset in the core network device. In addition, after receiving the attach request information transmitted by the terminal device, the core network device can generate the first core network key by using the third key generation algorithm based on the third root key, the core network device parameter, and the terminal device parameter that is included in the attach request information, where the first core network key is used to generate an integrity check code.

In this case, if the terminal device is allowed to access the core network device, based on a preset setting, the first root key is the same as the third root key, and the first key generation algorithm is the same as the second key generation algorithm. In addition, both a process of calculating the first terminal key and a process of calculating the first core network key are performed based on the terminal device parameter and the core network device parameter. Therefore, the first terminal key obtained through calculation is the same as the first core network key obtained through calculation.

Further, the first integrity algorithm is preset in the terminal device, and the attach accept information is calculated by using the first integrity algorithm, so that the second integrity check code can be obtained. The second integrity algorithm is preset in the core network device, and the attach accept information is calculated by using the second integrity algorithm, so that the first integrity check code can be obtained. If the terminal device is allowed to access the core network device, the first integrity algorithm is preset to be the same as the second integrity algorithm.

The first terminal key is the same as the first core network key, the first integrity algorithm is the same as the second integrity algorithm, and in both a process of calculating the first integrity check code and a process of calculating the second integrity check code, the attach accept information is calculated. Therefore, when the identity of the core network device is valid, the first integrity check code is the same as the second integrity check code. In this case, the terminal device can determine, by comparing whether the first integrity check code is the same as the second integrity check code, whether the identity of the core network device is valid.

Further, in this embodiment of this application, the second processing module is specifically configured to: generate a second core network key by using a preset fourth key generation algorithm based on a preset fourth root key, a core network device parameter, and a terminal device parameter that is included in the attach request information, and decrypt the encrypted attach complete information by using a preset second encryption and decryption algorithm based on the second core network key.

In this embodiment of this application, a second root key is preset in the terminal device, and the attach request information includes the terminal device parameter. After receiving the attach accept information, the terminal device obtains the core network device parameter, and then generates a second terminal device key based on the second root key, the terminal device parameter, the core network device parameter, and the second key generation algorithm, where the second terminal device key is used to encrypt and protect exchanged information.

In addition, a fourth root key is preset in the core network device, and after receiving the attach request information transmitted by the terminal device, the core network device generates the second core network device key by using the fourth key generation algorithm based on the fourth root key, the core network device parameter, and the terminal device parameter that is included in the attach request information, where the second core network device key is used to encrypt and protect exchanged information.

In this case, if the terminal device is allowed to access the core network device, it is preset that the second root key is the same as the fourth root key, and the second key generation algorithm is the same as the fourth key generation algorithm. In addition, both a process of calculating the second terminal device key and a process of calculating the second core network device key are performed based on the terminal device parameter and the core network device parameter. Therefore, the second terminal device key is the same as the second core network device key.

Further, the first encryption and decryption algorithm is preset in the terminal device, so that the attach complete information is encrypted by using the first encryption and decryption algorithm. The second encryption and decryption algorithm is preset in the core network device, so that the attach complete information is decrypted by using the second encryption and decryption algorithm. If the terminal device is allowed to access the core network device, the first encryption and decryption algorithm is preset to be the same as the second encryption and decryption algorithm, so that the core network device can decrypt information encrypted by the terminal device.

In addition, in this embodiment of this application, the terminal device parameter includes a terminal device identity and a terminal random number that is generated by the terminal device, and the core network device parameter includes a core network device identity and a core network random number that is generated by the core network device.

Correspondingly, an embodiment of this application further discloses a terminal device. The terminal device includes a transceiver port, a processor, and a memory connected to the processor. The transceiver port is configured to: exchange information with a core network device, and transmit information that is received from the core network device to the processor. The memory stores an instruction that can be executed by the processor. The processor is configured to: obtain a packet transmitted by the transceiver port, and perform, by executing a program or the instruction stored in the memory, the information exchange method disclosed in the first embodiment of this application.

Correspondingly, an embodiment of this application further discloses a core network device. The core network device includes a transceiver port, a processor, and a memory connected to the processor. The transceiver port is configured to: exchange information with a terminal device, and transmit information that is received from the terminal device to the processor. The memory stores an instruction that can be executed by the processor. The processor is configured to: obtain a packet transmitted by the transceiver port, and perform, by executing a program or the instruction stored in the memory, the information exchange method disclosed in the second embodiment of this application.

An embodiment of this application further provides a computer program product, including an instruction. When the instruction is run on a computer, the computer is enabled to perform the information exchange method disclosed in the method embodiment disclosed in FIG. 2.

An embodiment of this application further provides a computer program product, including an instruction. When the instruction is run on a computer, the computer is enabled to perform the information exchange method disclosed in the method embodiment disclosed in FIG. 6.

During specific implementation, an embodiment of this application further provides a computer storage medium. The computer storage medium may store a program, and when the program is executed, some or all steps of the information exchange method in the method embodiment disclosed in FIG. 2 or FIG. 6 can be implemented. The storage medium may be a magnetic disk, an optical disc, a read-only memory (ROM), a random access memory (RAM), or the like.

An embodiment of this application further provides a chip. The chip apparatus includes a memory, a processor, and a computer program that is stored in the memory and that can be run on the processor. When executing the computer program, the processor implements the information exchange method disclosed in the first embodiment or the second embodiment of this application.

It should be noted that, based on an implementation requirement, the components/steps described in the embodiments of this application may be divided into more components/steps, or two or more components/steps or some operations of the components/steps may be combined into a new component/step, to achieve the objectives of this application.

A person skilled in the art may clearly understand that, the technologies in the embodiments of this application may be implemented by software in addition to a necessary general hardware platform. Based on such an understanding, the technical solutions of this application essentially or the part contributing to the prior art may be implemented in a form of a software product. The software product may be stored in a storage medium, such as a ROM/RAM, a magnetic disk, an optical disc, or the like, and include several instructions for enabling a computer device (which may be a personal computer, a server, a network device, or the like) to perform the methods described in the embodiments or some parts of the embodiments of this application.

For same or similar parts in the embodiments in this specification, refer to each other. Especially, the apparatus embodiment is basically similar to the method embodiment, and therefore is described briefly. For related parts, refer to the descriptions in the method embodiment.

The foregoing implementations of this application do not constitute a limitation on the protection scope of this application.

What is claimed is:

1. An information exchange method, comprising:
  receiving, by a terminal device, attach accept information transmitted by a core network device,
    wherein the attach accept information comprises a first integrity check code of the core network device;
  obtaining, by the terminal device, a second integrity check code based on the attach accept information;

obtaining, by the terminal device if the first integrity check code is the same as the second integrity check code, encrypted attach complete information;

obtaining a third integrity check code based on the encrypted attach complete information;

adding the third integrity check code to the encrypted attach complete information; and transmitting the encrypted attach complete information to the core network device.

2. The information exchange method according to claim 1 wherein the obtaining, by the terminal device, the second integrity check code based on the attach accept information comprises:

generating, by the terminal device, a first terminal key by using a preset first key generation algorithm based on
a preset first root key,
a terminal device parameter, and
a core network device parameter that is comprised in the attach accept information; and obtaining, by the terminal device, the second integrity check code by using a preset first integrity algorithm based on the first terminal key and the attach accept information.

3. The information exchange method according to claim 2, wherein the terminal device parameter comprises
a terminal device identity and
a terminal random number that is generated by the terminal device.

4. The information exchange method according to claim 2, wherein the core network device parameter comprises
a core network device identity and
a core network random number that is generated by the core network device.

5. The information exchange method according to claim 1, wherein the obtaining, by the terminal device, the encrypted attach complete information comprises:
generating, by the terminal device, a second terminal key by using
a preset second key generation algorithm based on a preset second root key,
a terminal device parameter, and
a core network device parameter that is comprised in the attach accept information; and encrypting, by the terminal device after generating attach complete information, the attach complete information by using a preset first encryption and decryption algorithm based on the second terminal key.

6. An information exchange apparatus, comprising:

at least one processor, and a memory storing computer-executable instructions;

wherein the computer-executable instructions, when executed by the at least one processor, further cause the information exchange apparatus to:

receive attach accept information transmitted by a core network device, wherein the attach accept information comprises a first integrity check code of the core network device;

obtain a second integrity check code based on the attach accept information;

obtain, if the first integrity check code is the same as the second integrity check code, encrypted attach complete information;

obtain a third integrity check code based on the encrypted attach complete information;

add the third integrity check code to the encrypted attach complete information; and transmit the encrypted attach complete information to the core network device.

7. The information exchange apparatus according to claim 6, wherein the computer-executable instructions instruct the information exchange apparatus to:

generate a first terminal key by using a preset first key generation algorithm based on
a preset first root key,
a terminal device parameter, and
a core network device parameter that is comprised in the attach accept information, and obtain the second integrity check code by using a preset first integrity algorithm based on the first terminal key and the attach accept information.

8. The information exchange apparatus according to claim 7, wherein the terminal device parameter comprises
a terminal device identity and
a terminal random number that is generated by the terminal device.

9. The information exchange apparatus according to claim 7, wherein the core network device parameter comprises
a core network device identity and
a core network random number that is generated by the core network device.

10. The information exchange apparatus according to claim 6, wherein the computer-executable instructions instruct the information exchange apparatus to:

generate a second terminal key by using
a preset second key generation algorithm based on a preset second root key,
a terminal device parameter, and
a core network device parameter that is comprised in the attach accept information, and encrypt, after generating attach complete information, the attach complete information by using a preset first encryption and decryption algorithm based on the second terminal key.

11. A non-transitory storage medium comprising instructions which, when executed by a computer, cause the computer to:

receive attach accept information transmitted by a core network device, wherein the attach accept information comprises a first integrity check code of the core network device;

obtain a second integrity check code based on the attach accept information;

obtain, if the first integrity check code is the same as the second integrity check code, encrypted attach complete information;

obtain a third integrity check code based on the encrypted attach complete information;

add the third integrity check code to the encrypted attach complete information; and transmit the encrypted attach complete to the core network device.

12. The non-transitory storage medium according to claim 11, wherein when the instructions are executed by the computer, the instructions further cause the computer to:
generate a first terminal key by using a preset first key generation algorithm based on
a preset first root key,
a terminal device parameter, and
a core network device parameter that is comprised in the attach accept information; and
obtain the second integrity check code by using a preset first integrity algorithm based on the first terminal key and the attach accept information.

13. The non-transitory storage medium according to claim 11, wherein when the instructions are executed by the computer, the instructions further cause the computer to:
generate a second terminal key by using
a preset second key generation algorithm based on a preset second root key,
a terminal device parameter, and
a core network device parameter that is comprised in the attach accept information; and
encrypt, after generating attach complete information, the attach complete information by using a preset first encryption and decryption algorithm based on the second terminal key.

14. The non-transitory storage medium according to claim 11,
wherein the terminal device parameter comprises
a terminal device identity and
a terminal random number that is generated by the terminal device.

15. The non-transitory storage medium according to claim 11,
wherein the core network device parameter comprises
a core network device identity and
a core network random number that is generated by the core network device.

* * * * *